United States Patent
Wang et al.

(10) Patent No.: US 10,574,327 B2
(45) Date of Patent: Feb. 25, 2020

(54) WIRELESS DEVICE, FIRST AND SECOND NETWORK NODES AND RESPECTIVE METHODS PERFORMED THEREBY FOR COMMUNICATING THEREBETWEEN

(71) Applicant: Telefonaktiebolaget LM Ericsson (publ), Stockholm (SE)

(72) Inventors: Min Wang, Luleå (SE); Erik Larsson, Uppsala (SE); Mårten Ericson, Luleå (SE); Jan Christoffersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/542,738

(22) PCT Filed: Jan. 23, 2015

(86) PCT No.: PCT/SE2015/050065
§ 371 (c)(1),
(2) Date: Jul. 11, 2017

(87) PCT Pub. No.: WO2016/118057
PCT Pub. Date: Jul. 28, 2016

(65) Prior Publication Data
US 2017/0353224 A1  Dec. 7, 2017

(51) Int. Cl.
*H04W 4/00* (2018.01)
*H04B 7/06* (2006.01)
*H04W 36/18* (2009.01)

(52) U.S. Cl.
CPC ......... *H04B 7/0634* (2013.01); *H04B 7/0617* (2013.01); *H04B 7/0665* (2013.01); *H04W 36/18* (2013.01)

(58) Field of Classification Search
None
See application file for complete search history.

(56) References Cited

U.S. PATENT DOCUMENTS

| | | | |
|---|---|---|---|
| 2011/0176593 A1 | 7/2011 | Hultell et al. | |
| 2013/0094477 A1 | 4/2013 | Liu et al. | |
| 2014/0119304 A1* | 5/2014 | Li | H04W 52/146 370/329 |

FOREIGN PATENT DOCUMENTS

| | | |
|---|---|---|
| EP | 2744120 A2 | 6/2014 |
| WO | 2013040374 A1 | 3/2013 |
| WO | 2014023568 A1 | 2/2014 |

OTHER PUBLICATIONS

Author Unknown, "Technical Specification Group Radio Access Network; Study on UMTS heterogeneous networks (Release 12)," Technical Report 25.800, Version 12.1.0, 3GPP Organizational Partners, Dec. 2013, 165 pages.

(Continued)

*Primary Examiner* — Zewdu A Beyen
(74) *Attorney, Agent, or Firm* — Patent Portfolio Builders, PLLC

(57) ABSTRACT

A wireless device and a method performed thereby for communicating with a first network node and a second network node by means of a respective cell thereof are proved. Also a first and second network node and respective methods performed thereby for communicating with a wireless device are provided. The wireless device is in soft handover with at least two cells in its active set where downlink is best from one cell and uplink is best towards another cell, wherein the cell providing the best downlink belongs to the first network node and the cell providing the best uplink belongs to the second network node.

10 Claims, 13 Drawing Sheets

(56) References Cited

OTHER PUBLICATIONS

Author Unknown, "Technical Specification Group Radio Access Network; Physical layer procedures (FDD) (Release 11)," Technical Specification 25.214, Version 11.8.0, 3GPP Organizational Partners, Mar. 2014, 128 pages.
Author Unknown, "Technical Specification Group Radio Access Network; High Speed Downlink Packet Access (HSDPA); Overall description; Stage 2 (Release 12)," Technical Specification 25.308, Version 12.1.0, 3GPP Organizational Partners, Sep. 2014, 76 pages.
Author Unknown, "Technical Specification Group Radio Access Network; Enhanced uplink; Overall description; Stage 2 (Release 12)," Technical Specification 25.319, Version 12.1.0, 3GPP Organizational Partners, Sep. 2014, 91 pages.
Li, Yuan et al., "Adaptive Heterogeneous Coordinated Beamforming Algorithm in LTE-Advanced Systems," IEEE Wireless Communications and Networking Conference (WCNC), Apr. 7-10, 2013, Shanghai, China, IEEE, pp. 1893-1897.
Qualcomm Incorporated, "R1-140706: Solutions for UL/DL Imbalance," 3rd Generation Partnership Project (3GPP), TSG RAN WG1 Meeting #76, Feb. 10-14, 2014, 4 pages, Prague, Czech Republic.
International Search Report and Written Opinion for International Patent Application No. PCT/SE2015/050065, dated Nov. 30, 2015, 19 pages.
Office Action issued in application No. 15704608.7; dated Jan. 3, 2019; 08 pages.

\* cited by examiner

WIRELESS DEVICE, FIRST AND SECOND NETWORK NODES AND RESPECTIVE METHODS PERFORMED THEREBY FOR COMMUNICATING THEREBETWEEN

This application is a 35 U.S.C. § 371 national phase filing of International Application No. PCT/SE2015/050065, filed Jan. 23, 2015, the disclosure of which is incorporated herein by reference in its entirety.

TECHNICAL FIELD

The present disclosure relates to wireless communication and in particular to wireless communication in wireless communication networks where there is an imbalance in uplink and downlink channel quality.

BACKGROUND

The large uptake of mobile broadband has resulted in significantly increased traffic volumes that need to be handled by the networks (e.g. Wideband Code Division Multiple Access, WCDMA, /High Speed Packet Access, HSPA). Therefore, techniques that allow cellular operators to manage their network more efficiently are of large importance. An example of a technique whereby it is possible to improve the downlink performance is to introduce support for 4-branch Multiple Input Multiple Output, MIMO, multi-flow communication, multi carrier deployment etc. Since the spectral efficiency per link is approaching theoretical limits, the next step is about improving the spectral efficiency per unit area. In other words, additional features for HSDPA need to provide a uniform user experience anywhere inside a cell of a network node by changing the topology of traditional networks. A cell is a coverage area of a base station or network node.

Deployment of low-power nodes, LPNs, may be a tool to meet the ever-increasing demand for mobile broadband services. A LPN may correspond, for example, to a remote radio unit, RRU, Pico, or Micro base station, allowing expanding the network capacity in a cost-efficient way. Note that the power transmitted by these LPNs is relatively small compared to that of macro base stations, e.g. 2 W as compared 20 W for a typical Macro base station. A network consisting of traditional Macro NodeBs and LPNs is referred to as a heterogeneous network. Two examples of use-cases for heterogeneous network deployment that may be envisioned are coverage holes and capacity enhancement for localised traffic hotspots.

Deployed LPNs in a heterogeneous network are typically classified as either co-channel (also named separated cell) where each LPN has its own cell identity (primary scrambling code) or combined cell (also named soft cell) where the LPNs have the same cell identities as the Macro cell.

Some of the problems with the co-channel deployment spawn from the fact that each LPN creates a different cell. For example, the different transmit powers of Macros and LPNs create an inherent Uplink/Downlink, UL/DL, imbalance region which affects the interference characteristics in the network and affects the robustness of uplink, UL, control channel. For example, the downlink, DL, channel quality indication, CQI, the Hybrid Automatic Repeat reQuest, HARQ, acknowledgements, AKCs, and the Happy bit may not be received successfully due to the issue of the UL power control, i.e. the transmission power of a wireless device is dominantly controlled by LPN. This may negatively affect both the UL and DL throughput. FIG. 1a shows the co-channel deployment. Employing low power nodes in a macro cell in a co-channel fashion offers load balancing (traffic offloading to LPNs), which brings large capacity gain, both average system throughput as well as cell edge user throughput.

In a heterogeneous network, the DL transmission power of the macro cells are typically much higher than for the LPNs. This will create an imbalance region where the DL received power is higher for the macro node but where the UL is much better to the LPN. This may lead to several problems.

If a wireless device, e.g. a User Equipment, UE, is in the imbalance region, but not in the Soft Hand Over, SHO, area the wireless device is power controlled by the macro cell only, i.e. the macro base station (e.g. node B) in the cell thereof by means on which the macro base station is serving the wireless device. In this case, the uplink transmission of the wireless device in the Macro cell may create high interference to the LPN node.

If the wireless device is in SHO area, the UL power control is handled jointly by the macro and LPN, but due to the much better UL to the LPN it will effectively be controlled by the LPN (since the down TPC commands has precedence at the UE). If the macro is the serving cell, i.e. the macro base station is serving the wireless device by means of the cell of the macro base station, the UL received power may be too low to be heard by the macro. This may lead to inadequate reception of the Uplink High Speed-Dedicated Physical Control Channel, HS-DPCCH, and hence ineffective downlink High-Speed Downlink Shared Channel, HS-DSCH. Also the Enhanced Dedicated Physical Control Channel, E-DPCCH, may be too weak to be heard by the macro leading to ineffective Enhanced Dedicated Physical Data Channel, E-DPDCH.

In cases where the LPN offload is increased by small cell range expansion, the even higher imbalance will create high interference for wireless devices served by the LPN and hence reduced DL throughput. FIG. 1a illustrates the imbalance region for co-channel deployment.

Some solutions to combat the negative effects of the UL/DL imbalance have been proposed. For example power boosting of UL control channels, inner-loop power control restrictions and introduction of a secondary pilot.

Other solutions have been proposed, such as Enhanced Dedicated Channel, E-DCH, decoupling which may improve the reception of E-DPCCH, hence improve the E-DCH transmission by directly serving the wireless device via LPN. However, the robustness of HS-DPCCH reception at the macro base station remains the same as non E-DCH decoupling case. This means that E-DCH decoupling does not solve the imbalance issues for the control channels, it merely enhances the E-DCH transmissions by moving the UL scheduling to the LPN instead of the macro base station.

SUMMARY

The object is to obviate at least some of the problems outlined above. In particular, it is an object to provide a wireless device and a method performed thereby for communicating with a first network node and a second network node by means of a respective cell thereof. A further object is to provide a first network node and a method performed thereby for communicating with a wireless device in a communication network, Still a further object is to provide a second network node and a method performed thereby for communicating with a wireless device in a communication network, These objects and others may be obtained by providing a wireless device, a first and a second network node and a method performed by a wireless device, a first and a second network node respectively according to the independent claims attached below.

According to an aspect a method performed by a wireless device for communicating with a first network node and a second network node by means of a respective cell thereof is provided. The wireless device is in soft handover with at least two cells in its active set where downlink is best from one cell and uplink is best towards another cell, wherein the cell providing the best downlink belongs to the first network node and the cell providing the best uplink belongs to the second network node. The method comprises transmitting at least one channel out of a first set of channels using a first beamforming towards the first network node to enhance the reception in the first network node, and transmitting the at least one channel out of the first set of channels or at least one channel out of a second set of channels using a second beamforming towards the second network node to enhance the reception in the second network node.

According to an aspect, a method performed by a first network node for communicating with a wireless device in a communication network is provided, The method comprises detecting that the wireless device is being in soft handover with at least two cells in its active set, where downlink is best from one cell and uplink is best towards another cell, wherein the cell providing the best downlink belongs to the first network node and the cell providing the best uplink belongs to a second network node; and receiving, from a Radio Network Controller, RNC, information that the wireless device supports transmissions of at least one channel of out of set(s) of channels using different beamforming for transmission of at least one channel of the set(s) of channels towards the first network node and towards the a second network node respectively. The method further comprises transmitting information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

According to an aspect, a method performed by a second network node for communicating with a wireless device in a communication network, wherein the wireless device is being served by a first network node is provided, The method comprises receiving, from the wireless device, at least one channel out of a set of channels transmitted using a beamforming which is different from a beamforming used by the wireless device for transmitting the same or another channel out of another set of channels to the first network node. The method further comprises determining feedback information for the received channel; and transmitting the feedback information to the wireless device.

According to an aspect, a wireless device for communicating with a first network node and a second network node by means of a respective cell thereof is provided. The wireless device is in soft handover with at least two cells in its active set where downlink is best from one cell and uplink is best towards another cell, wherein the cell providing the best downlink belongs to the first network node and the cell providing the best uplink belongs to the second network node. The wireless device is configured for transmitting at least one channel out of a first set of channels using a first beamforming towards the first network node to enhance the reception in the first network node, and for transmitting the at least one channel out of the first set of channels or at least one channel out of a second set of channels using a second beamforming towards the second network node to enhance the reception in the second network node.

According to an aspect, a first network node for communicating with a wireless device in a communication network is provided, The first network node is configured for detecting that the wireless device is being in soft handover with at least two cells in its active set, where downlink is best from one cell and uplink is best towards another cell, wherein the cell providing the best downlink belongs to the first network node and the cell providing the best uplink belongs to a second network node; and receiving, from a Radio Network Controller, RNC, information that the wireless device supports transmissions of at least one channel of out of set(s) of channels using different beamforming for transmission of at least one channel of the set(s) of channels towards the first network node and towards the a second network node respectively. The first network node is further configured for transmitting information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

According to an aspect, a second network node for communicating with a wireless device in a communication network, wherein the wireless device is being served by a first network node is provided, The second network node is configured for receiving, from the wireless device, at least one channel out of a set of channels transmitted using a beamforming which is different from a beamforming used by the wireless device for transmitting the same or another channel out of another set of channels to the first network node. The second network node is further configured for determining feedback information for the received channel; and transmitting the feedback information to the wireless device.

The respective method performed by the wireless device and the first and the second network node, as well as the wireless device and the first and the second network node themselves may have several possible advantages. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

BRIEF DESCRIPTION OF DRAWINGS

Embodiments will now be described in more detail in relation to the accompanying drawings, in which.

DETAILED DESCRIPTION

Briefly described, a wireless device and a method performed thereby for communicating with a first network node and a second network node by means of a respective cell thereof are provided. The wireless device is in soft handover with at least two cells in its active set where downlink is best from one cell and uplink is best towards another cell, wherein the cell providing the best downlink belongs to the first network node and the cell providing the best uplink belongs to the second network node. Further, a first network node and a method performed thereby for communicating with a wireless device in a communication network are provided. Still further a second network node and a method performed thereby for communicating with a wireless device in a communication network, wherein the wireless device is being served by a first network node are provided.

By beamforming uplink transmissions to both the first and the second network node using specific precoding weights for the first and the second network node respectively, the wireless device may optimise both the uplink throughput and the downlink throughput when the is an uplink/downlink imbalance.

Figure 1A:
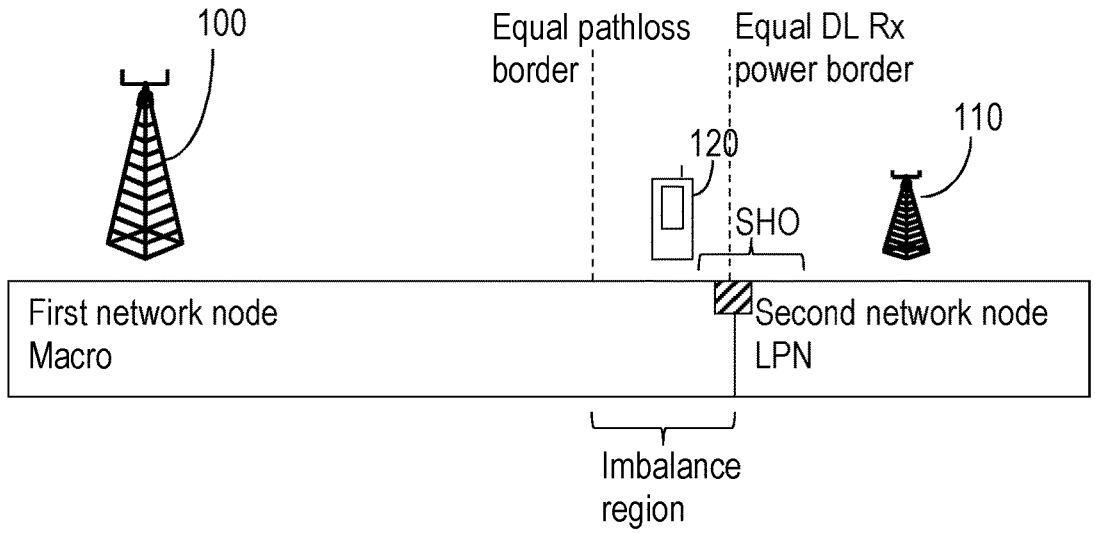
FIG. 1a is an illustration of two network nodes in a heterogeneous network.
Figure 1B:
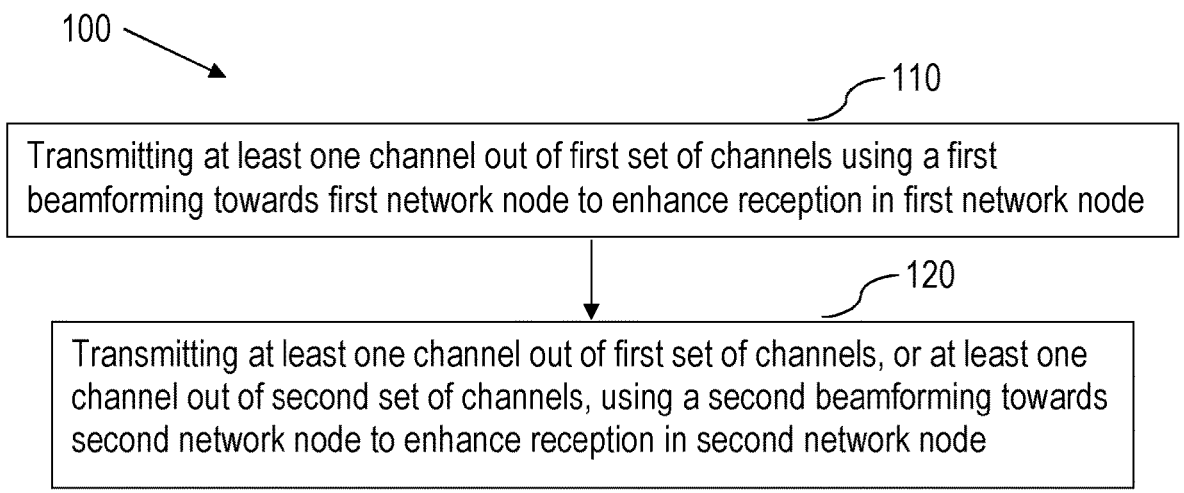
FIG. 1b is a flowchart of a method performed by a wireless device for communicating with a first network node and a second network node by means of a respective cell thereof, according to an exemplifying embodiment.

Embodiments of a method performed by a wireless device for communicating with a first network node and a second network node by means of a respective cell thereof will now be described with reference to FIG. 1*a*. The wireless device is in soft handover with at least two cells in its active set where downlink is best from one cell and uplink is best towards another cell, wherein the cell providing the best downlink belongs to the first network node and the cell providing the best uplink belongs to the second network node. The method 100 comprises transmitting 110 at least one channel out of a first set of channels using a first beamforming towards the first network node to enhance the reception in the first network node, and transmitting 120 the at least one channel out of the first set of channels or at least one channel out of a second set of channels using a second beamforming towards the second network node to enhance the reception in the second network node.

The wireless device may be located in an imbalance zone, or area, such that it experiences that the downlink is best from one cell and the uplink is best towards another cell, wherein the cell providing the best downlink belongs to the first network node and the cell providing the best uplink belongs to the second network node. When the wireless device is in soft handover, the wireless device needs to transmit uplink signals to both the first and the second network node. Both the first and the second network node may perform analysis of the received signal with regard to e.g. received signal strength, channel quality and so on. Based in these measurements, the first and the second network node may determine when a handover is to take place. Also, for the first network node, it may use this information in order to determine a transmission power in downlink to the wireless device.

When the downlink is best from one cell (of the first network node) and the uplink is best towards another cell (of the second network node), the wireless device may be relatively far from the first network node and relatively close to the second network node.

In order for the first network node and/or the second network node to determine transmission powers in the uplink and/or downlink, the network nodes may employ open or closed loop methods.

Likewise, the wireless device may determine an uplink transmission power based at least partly on a received downlink signal strength. The received downlink signal strength/quality may be reported to the first and/or the second network node. The first and/or the second network node may then use this information to determine an uplink transmission power to be used by the wireless device for an uplink transmission. Thus it is important that the received downlink signal strength/quality reflects the channel conditions in an appropriate manner. If the received downlink signal strength/quality is too strong, the first network node may use too weak a transmission power for an uplink transmission to the second network node.

In order to ascertain that both the first and the second network node receive the transmitted uplink signals in a good way, the wireless device thus transmits at least one channel out of the first set of channels using the first beamforming towards the first network node to enhance the reception in the first network node, and transmits the at least one channel out of the first set of channels or at least one channel out of the second set of channels using the second beamforming towards the second network node to enhance the reception in the second network node.

The first and second set of channels may comprise pilot signals/bits, reference signals, and/or control channel information, and/or data channels. Also, at least a part of the first set of channels may be comprised in the second set of channels.

Examples of the cell providing the best downlink may be a serving HS-DSCH cell and the cell providing the best uplink may be a serving E-DCH.

In case the first and the second network node are employed in a heterogeneous communication network comprising macro network nodes and low power network nodes, LPNs, the first network node may be a macro network node and the second network node may be a LPN.

The method performed by the wireless device may have several advantages. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

When the at least one channel out of the first set of channels is transmitted using the second beamforming, the method may comprise repeatedly transmitting the channel to the first network node using the first beamforming in a time slot and transmitting the channel to the second network node using the second beamforming in a subsequent time slot.

As stated above, there may be one, two or more sets of channels that may be transmitted to the first and the second network node respectively. In the case there is only one set of channels, meaning that the same set is transmitted to both the first and the second network node, however with different beamforming between the first and the second network node, the wireless device may repeatedly alternate between transmitting the first set of channels using the first beamforming (towards the first network node) and transmitting the first set of channels using the second beamforming (towards the second network node) on a time slot basis.

Merely as an example, odd time slots use one beamforming (i.e. precoding vector) and even time slots use the other beamforming (i.e. precoding vector). Another alternative is to do the alternation within a time slot, for example, a precoder alternates between e.g. every (or a group of) other pilot symbol within a slot.

A channel may be comprised in both the first and the second set of channels. The set of channels are dynamic and different channels may be added or deleted from the respective sets between Transmission Time Intervals, TTIs.

Figure 1C:
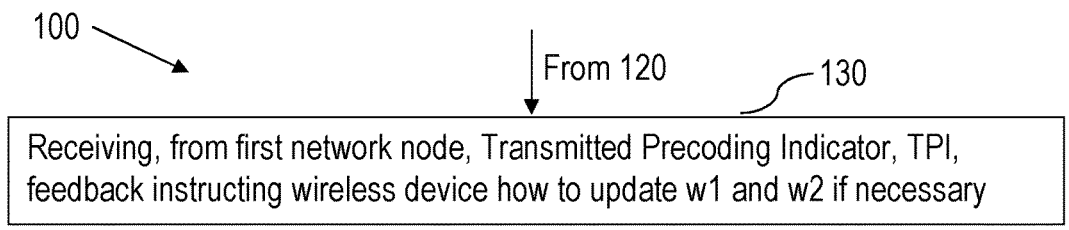
FIG. 1c is a flowchart of a method performed by a wireless device for communicating with a first network node and a second network node by means of a respective cell thereof, according to another exemplifying embodiment.

The first beamforming may comprise two precoding weights, w1 and w2, wherein the method 100 may further comprise receiving 130, from the first network node, a Transmitted Precoding Indicator, TPI, feedback instructing the wireless device how to update w1 and w2 if necessary, see FIG. 1c.

The beamforming is generally performed using a precoder that employs different precoding weights, also referred to as precoding vector, in order to beam form a transmission. After a transmission to the first network node using the first beamforming comprising the two precoding weights, w1 and w2, the first network node may evaluate the used precoding weights w1 and w2.

In this example, the wireless device is assumed to being equipped with at least two transmit antennas. In case the wireless device would have more antennas, the beamforming could be made more efficient and lead to larger gains. Each network node should be able to estimate the effective channel of the link in order to perform detection and demodulation. By effective channel estimate means an estimate of the channel experienced by the physical channel of interest (e.g. Enhanced Dedicated Physical Data Channel, E-DPDCH, or HS-DPCCH). The term effective hence includes both the wireless radio channel and potential precoding. To do efficient sounding, an estimate of the full rank channel is needed.

Once the first network node has performed an evaluation and/or estimation of the received transmission using the first beamforming comprising the two precoding weights, w1 and w2, the first network node transmits feedback to the wireless device. The feedback may inform the wireless device that the two precoding weights, w1 and w2, are good and they should be kept, or the feedback may inform the wireless device that that they need to be updated and how they need to be updated.

Figure 1D:
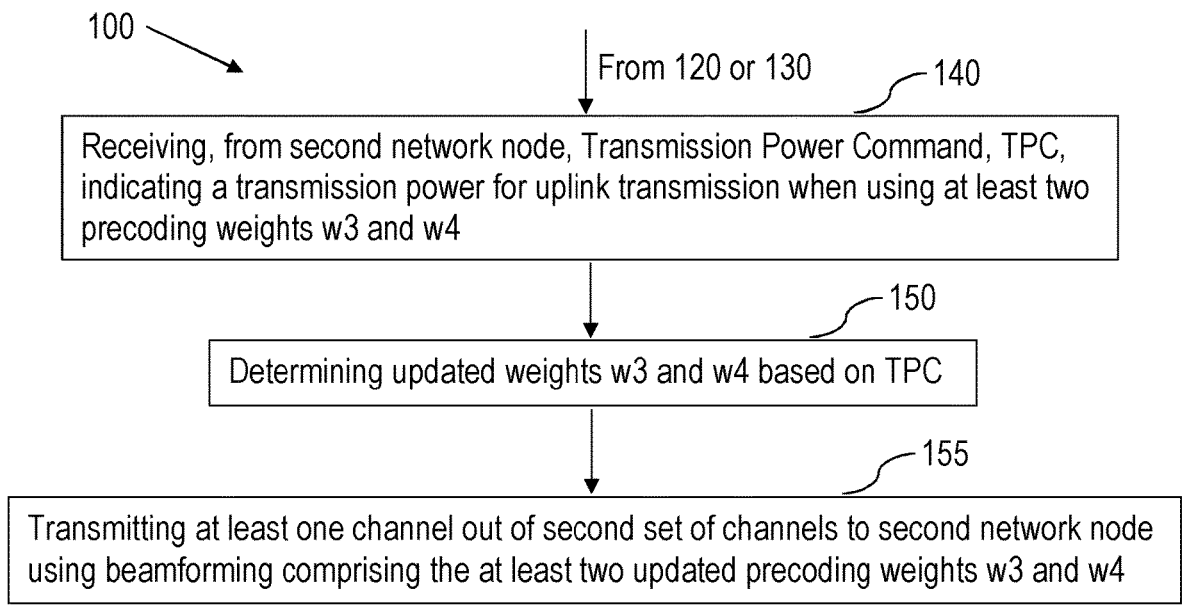
FIG. 1*d* is a flowchart of a method performed by a wireless device for communicating with a first network node and a second network node by means of a respective cell thereof, according to yet an exemplifying embodiment.

The second beamforming may comprise at least two precoding weights, w3 and w4, wherein the method 100 further may comprise receiving 140, from the second network node, a Transmission Power Command, TPC, indicating a transmission power for an uplink data transmission when using the at least two precoding weights w3 and w4, see FIG. 1d.

In a similar manner, the second beamforming comprises two precoding weights, w3 and w4, and the second network node may also perform an evaluation and/or estimation of the received transmission.

The second network node also provides the TPC to the wireless device, indicating a transmission power for an uplink data transmission when using the at least two precoding weights w3 and w4. Since the second network node is, or possibly will be, serving the wireless device in the uplink, the second network node may ultimately determine the uplink transmission power that the wireless device should use for uplink transmissions to the second network node. The second network node may estimate and/or evaluate the channel quality based on the received signal strength of the uplink transmission from the wireless device having been transmitted using the second beamforming comprising the two precoding weights, w3 and w4.

The method 100 may further comprise determining 150 updated weights w3 and w4 based on the TPC and transmitting 155 the at least one channel out of the second set of channels to the second network node using a beamforming comprising the at least two updated precoding weights w3 and w4 towards the second network node.

As the wireless device has transmitted the first or the second set of channels using the second beamforming comprising precoding weights, w3 and w4, the wireless device receives the TPC.

The TPC instructs the wireless device to use a specific transmission power for an uplink transmission. Based on the TPC, the wireless device then determined updated precoding weights w3 and w4 to be used for transmitting at least one channel out of the first or the second set of channels towards the second network node. The wireless device may measure a TPC error and if the TPC error averaged over time is high, then the wireless device may adjust the weights and then check the TPC error again and adjust the weights accordingly.

Figure 1E:
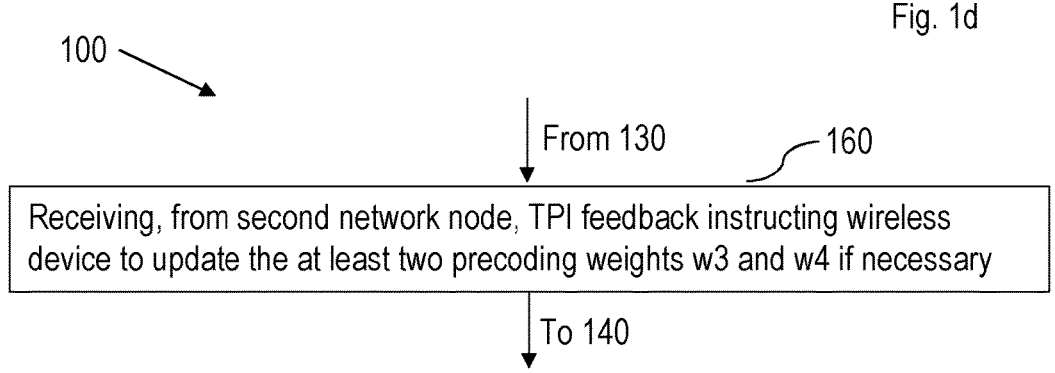
FIG. 1*e* is a flowchart of a method performed by a wireless device for communicating with a first network node and a second network node by means of a respective cell thereof, according to still an exemplifying embodiment.

The second beamforming may comprise at least two precoding weights, w3 and w4, wherein the method 100 may further comprise receiving 160, from the second network node, a TPI feedback instructing the wireless device to update the at least two precoding weights w3 and w4 if necessary, see FIG. 1e.

In the same manner as described above for the first network node, the second network node may evaluate the used precoding weights w3 and w4 of the second beamforming.

Once the second network node has performed an evaluation and/or estimation of the received transmission using the second beamforming comprising the two precoding weights, w3 and w4, the second network node transmits feedback to the wireless device. The feedback may inform the wireless device that the two precoding weights, w3 and w4, are good and they should be kept, or the feedback may inform the wireless device that that they need to be updated and how they need to be updated.

Figure 1F:
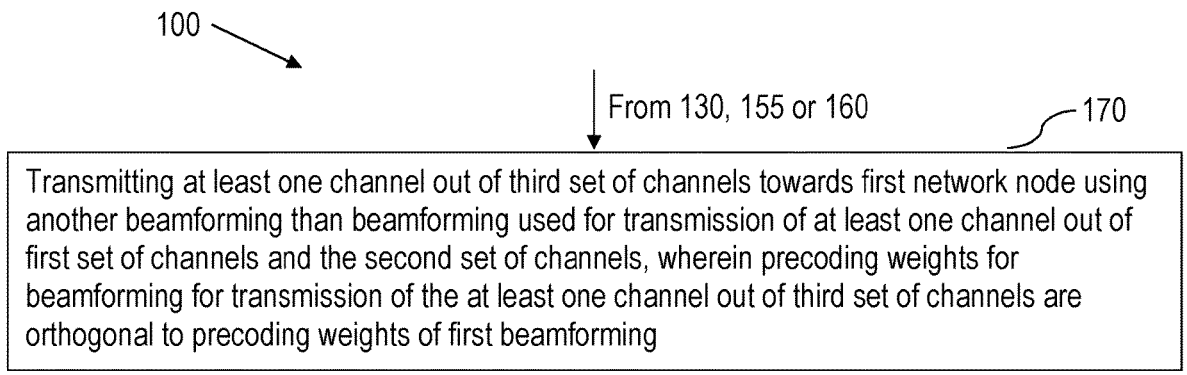
FIG. 1*f* is a flowchart of a method performed by a wireless device for communicating with a first network node and a second network node by means of a respective cell thereof, according to a further exemplifying embodiment.

In an example illustrated in FIG. 1f, the method 100 further comprises transmitting 170 at least one channel out of a third set of channels towards the first network node using another beamforming than the beamforming used for the transmission of the at least one channel out of the first and the second set of channels, wherein the precoding weights for the beamforming for the transmission of the at least one channel out of the third set of channels are orthogonal to the precoding weights of the first beamforming.

In order to select the precoding weights more optimal, full rank channel estimation is needed. One way to achieve this is to use e.g. more pilots with known (or no) precoding weights, i.e. the at least one channel out of the third set of channels. The precoding weights of the other (i.e. the third) beamforming are chosen to be orthogonal to the precoding weights of the first beamforming. This enables the first network node to estimate the channel with full rank and may therefore select the pre-coding weights in an optimal way. Hence the beamforming of the channels towards the first network node may be enhanced compared to using two sets of channels and two beamformings.

However, the second network node may still not estimate the channel with full rank as it only knows the precoding weights w3 and w4. In order to enhance this embodiment further, an UL feedback of used precoding weights could be used.

Figure 1G:
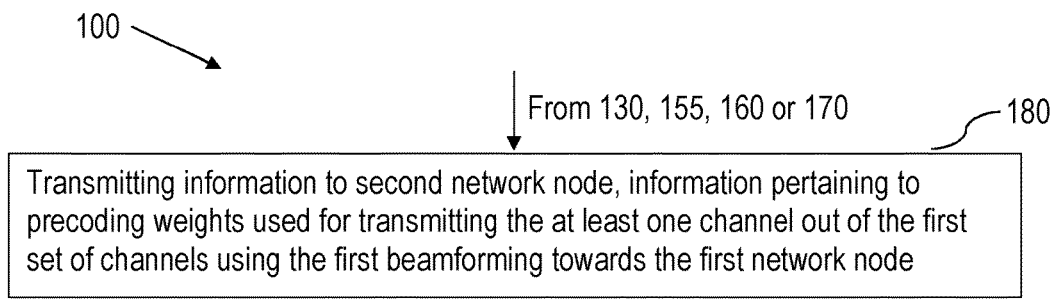
FIG. 1*g* is a flowchart of a method performed by a wireless device for communicating with a first network node and a second network node by means of a respective cell thereof, according to an exemplifying embodiment.

In yet an example illustrated in FIG. 1g, the method 100 further comprises transmitting information to the second network node, the information pertaining to the precoding weights used for first network node of the first beamforming used for transmitting the at least one channel out of the first set of channels using the first beamforming towards the first network node to enhance the reception in the first network node.

The wireless device may use a first beamforming comprising at least two precoding weights w1 and w2 for transmissions of the at least one channel of the first set of channels towards the first network node and a second beamforming comprising at least two precoding weights w3 and w4 for transmissions of at least one channel of the second set of channels towards the second network node.

The first network node generally knows the precoding weights of the beamforming used for transmissions to itself and likewise, the second network node generally knows the precoding weights of the beamforming used for transmissions to itself. However, the second network node may not know the precoding weights w1 and w2 for transmissions of the at least one channel of the first set of channels towards the first network node. Thus, the wireless device transmits, to the second network node, the precoding weights w1 and w2 for transmissions of the at least one channel of the first set of channels towards the first network node. If the second network node knows the precoding weights used to transmit to the first network node, i.e. w1 and w2, the second network node may use this knowledge for better channel estimation and more optimal selection of precoding weights w3 and w4 used for transmission to the second network node.

The information may be provided to the second network node by means of an uplink feedback channel in case the wireless device needs to inform the second network node of the precoding weights.

Figure 1H:
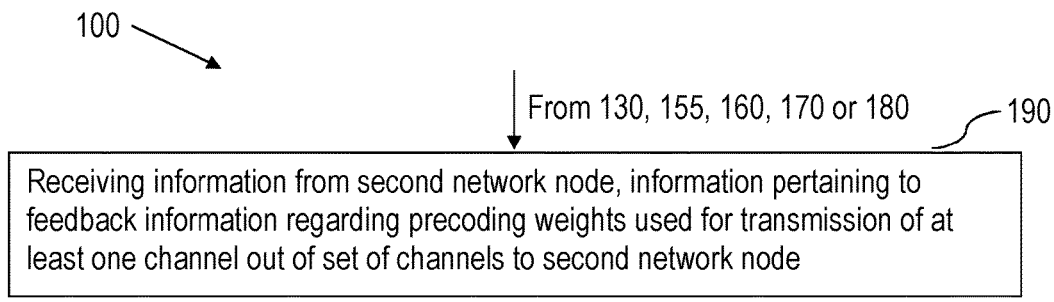
FIG. 1*h* is a flowchart of a method performed by a wireless device for communicating with a first network node and a second network node by means of a respective cell thereof, according to yet an exemplifying embodiment.

In still an example illustrated in FIG. 1h, the method 100 further comprises receiving 190 information from the second network node, the information pertaining to feedback information regarding the precoding weights used for the transmission of the at least one channel out of the second set of channels to the second network node.

By receiving this feedback, the wireless device is informed of whether the precoding weights used for the beamforming towards the second network node are good or not, if they need to be updated.

If the precoding weights need to be updated, the received information may further comprise information pertaining to how to update the precoding weights.

The feedback may be provided to the wireless device by means of a downlink feedback channel from the second network node in case the second network node needs to provide feedback of e.g. chosen precoding weights for E-DPCCH.

Embodiments herein also relate to a method performed by a first network node for communicating with a wireless device in a communication network. Embodiments of such a method will now be described with reference to FIG. 2a. The method 200 comprises detecting 210 that the wireless device is being in soft handover with at least two cells in its active set, where downlink is best from one cell and uplink is best towards another cell, wherein the cell providing the best downlink belongs to the first network node and the cell providing the best uplink belongs to a second network node; and receiving 220, from a Radio Network Controller, RNC, information that the wireless device supports transmissions of at least one channel of out of set(s) of channels using different beamforming for transmission of at least one channel of the set(s) of channels towards the first network node and towards the a second network node respectively. The method further comprises transmitting 230 information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

The first network node may be controlled by the RNC. The wireless device may initiate RRC signalling to report UE capability bit to RNC. The RNC then sends NBAP signalling including the UE capability bit to the first network node, to establish or modify a radio access bearer between the first network node and the wireless device.

The first network node detects 210 that the wireless device is being in soft handover with at least two cells in its active set, where downlink is best from one cell of the first network node and uplink is best towards another cell of the second network node. The first network node also receives the UE capability bit informing the first network node that the wireless device supports the method as described above.

The first network node may then transmit information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

The method performed by the first network node may have the same possible advantages as the method performed by the wireless device. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

Figure 2A:
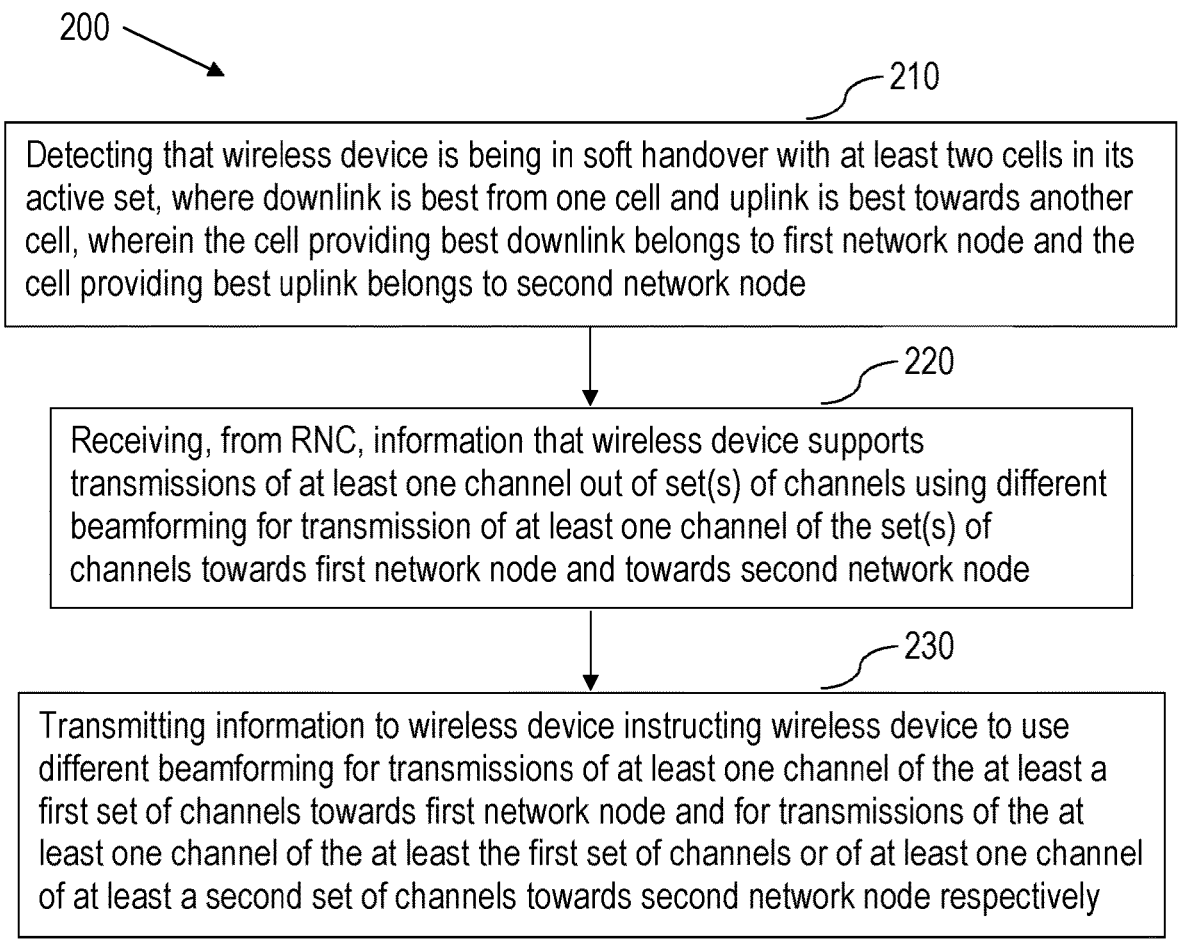
FIG. 2*a* is a flowchart of a method performed by a first network node for communicating with a wireless device in a communication network, according to an exemplifying embodiment.
Figure 2B:
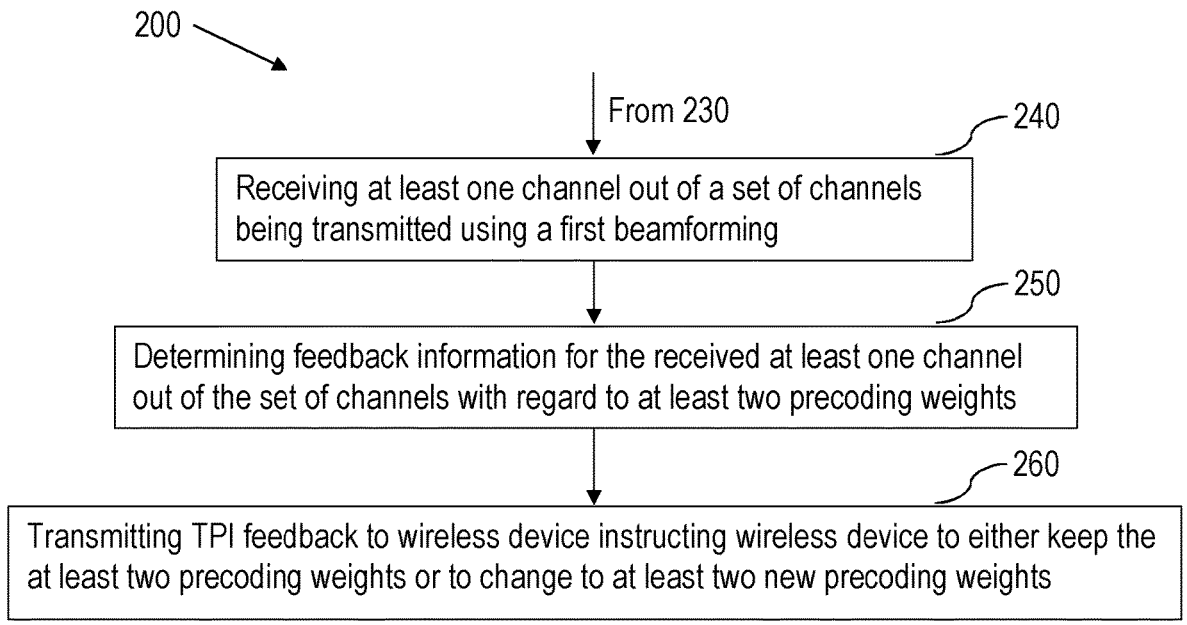
FIG. 2*b* is a flowchart of a method performed by a first network node for communicating with a wireless device in a communication network, according to yet an exemplifying embodiment.

The method 200 may further comprise receiving 240 at least one channel out of a set of channels being transmitted using first beamforming; determining 250 feedback information for the received at least one channel out of the set of channels with regard to at least two precoding weights; and transmitting 260 a Transmitted Precoding Indicator, TPI, feedback to the wireless device instructing the wireless device to either keep the at least two precoding weights and or to change to at least two new precoding weights, see FIG. 2b.

When the wireless device has transmitted the at least one channel out of the set of channels with regard to at least two precoding weights towards the first network node, the first network node receives the transmission.

The first network node evaluates and estimates the received transmission with regard to e.g. received signal strength and/or quality and based on the result thereof, determines the feedback information for the received at least one channel out of the set of channels with regard to at least two precoding weights. The feedback may comprise updated precoding weights that the wireless device should use for an upcoming transmission of at least one channel out of the set of channels towards the first network node. Alternatively, the feedback informs the wireless device to keep the used precoding weights and use them also for the upcoming transmission of at least one channel out of the set of channels towards the first network node. The feedback is in the form of the TPI.

The first network node then transmits the TPI feedback to the wireless device instructing the wireless device to either keep the at least two precoding weights and or to change to at least two updated (new) precoding weights.

Figure 2C:
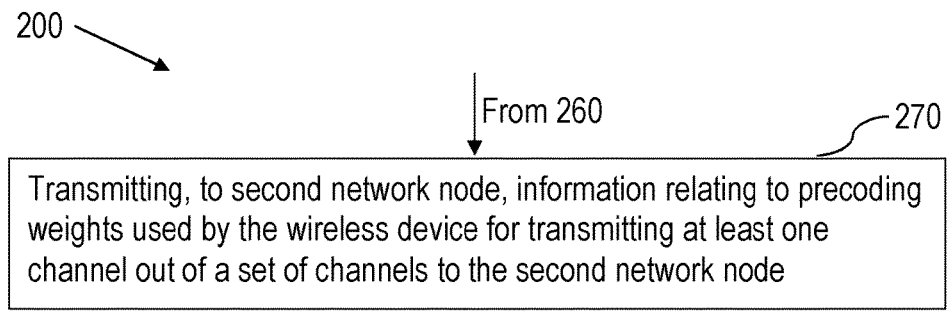
FIG. 2*c* is a flowchart of a method performed by a first network node for communicating with a wireless device in a communication network, according to an exemplifying embodiment.

In an example illustrated in FIG. 2c, the method 200 further comprises transmitting 270, to the second network node, information relating to precoding weights used by the wireless device for transmitting at least one channel out of a set of channels to the first network node.

Described above, with reference to the method performed by the wireless device, the wireless device could inform the second network node about the precoding weights used for the beamforming of transmissions towards the first network node.

Alternatively, the first network node may inform the second network node about the precoding weights used for transmitting at least one channel out of a set of channels, e.g. a pilot signal, to the first network node.

Determining that the wireless device supports transmissions of at least one channel out of set(s) of channels using different beamforming for transmission of the set(s) of channels towards the first network node and towards the second network node respectively may comprise receiving, from a Radio Network Controller, RNC, NBAP signalling comprising a UE capability bit indicating the capability of the wireless device. The first and the second network node may communicate by means of e.g. an X2 protocol, or via a RNC.

As described above, the wireless device may initiate RRC signalling to report UE capability bit to RNC. The RNC may then send NBAP signalling including the UE capability bit to the first network node, to establish or modify a radio access bearer between the first network node and the wireless device.

Embodiments herein also relate to a method performed by a second network node for communicating with a wireless device in a communication network, wherein the wireless device is being served by a first network node. Such embodiments will now be described with reference to FIG. 3a.

Figure 3A:
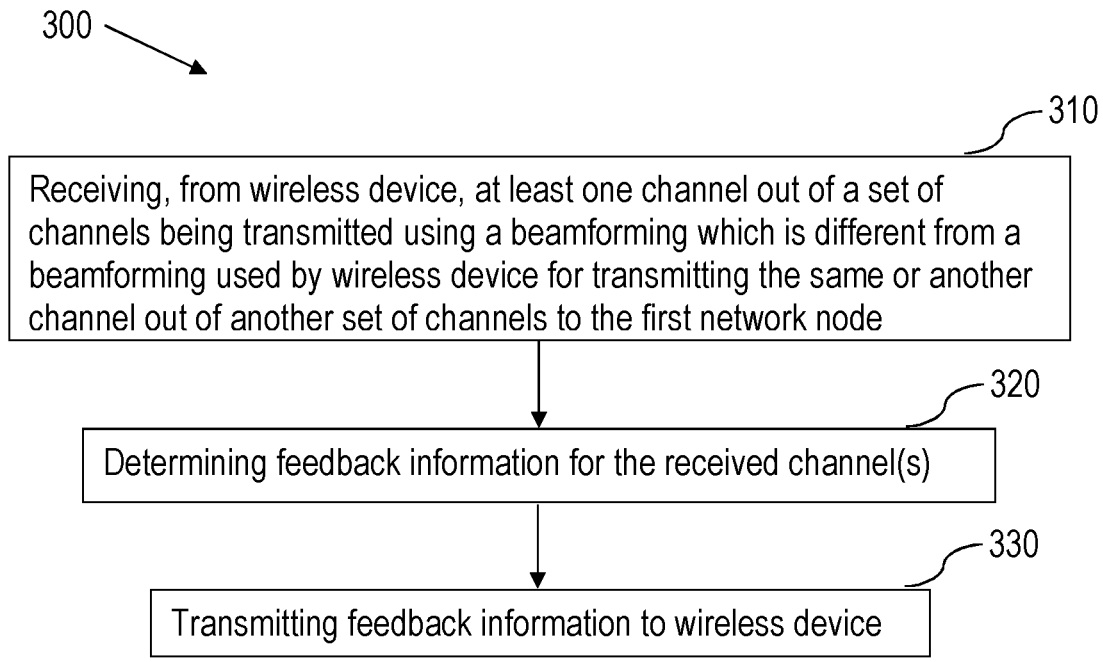
FIG. 3*a* is a flowchart of a method performed by a second network node for communicating with a wireless device in a communication network, according to an exemplifying embodiment.

FIG. 3a illustrates the method 300 comprising receiving 310, from the wireless device, at least one channel out of a set of channels transmitted using a beamforming which is different from a beamforming used by the wireless device for transmitting the same or another channel out of another set of channels to the first network node. The method further comprises determining 320 feedback information for the received channel; and transmitting 330 the feedback information to the wireless device.

The wireless device transmits at least one channel out of the set of channels towards the second network node using a beamforming that is "reserved for" the second network node. As described above, the wireless device also transmits at least one channel out of the same or another set of channels towards the first network node using a different beamforming than the one used for transmissions towards the second network node.

Also the second network node estimates and/or evaluates the channel based on the received signal strength and determines for the received channel, based on the estimation and/or evaluation. Once the second network node has determined the feedback, the second network node transmits the determined feedback to the wireless device.

The method performed by the second network node may have the same advantages as the method performed by the wireless device and the first network node. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

Determining the feedback may comprise determining a Transmission Power Command, TPC, indicating a transmission power for an uplink data transmission based on the received at least one channel.

The second network node is the receiver of uplink transmissions from the wireless device. Thus, once the second network node has estimated and/or evaluated the channel based on the received at least one channel out of the set of channels transmitted using the beamforming which is different from the beamforming used by the wireless device for transmitting the same or another channel out of another set of channels to the first network node, the second network node may determine a transmit power for the wireless device with regard to an upcoming transmission, of e.g. data, to the second network node.

The feedback thus takes the form of the TPC, wherein the wireless device may transmit e.g. the data to the second network node.

Determining the feedback may alternatively, or additionally, comprise determining a Transmitted Precoding Indicator, TPI, feedback based on at least two precoding weights of the beamforming used by the wireless device to transmit the at least one channel out of the set of channels, the TPI feedback instructing the wireless device to either keep the at least two precoding weights or to change to at least two new precoding weights.

Just, as for the first network node, the second network node may also determine TPI feedback in the same manner. The second network node may use the at least two precoding weights of the beamforming used by the wireless device to transmit the at least one channel out of the set of channels to the second network node.

Based on the estimation and/or evaluation, the second network node may thus also determine to keep or to update the precoding weights of the beamforming used by the wireless device to transmit the at least one channel out of the set of channels to the second network node.

Figure 3B:
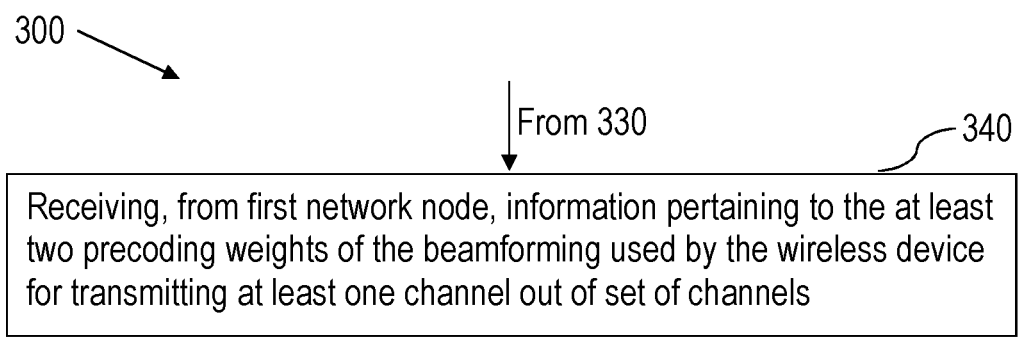
FIG. 3*b* is a flowchart of a method performed by a second network node for communicating with a wireless device in a communication network, according to yet an exemplifying embodiment.

The method 300 may further comprise receiving 340, from the first network node, information pertaining to the at least two precoding weights of the beamforming used by the wireless device to transmit the at least one channel out of the set of channels, see FIG. 3b.

In order for the second network node to be able to determine feedback with regard to the precoding weights of the beamforming used by the wireless device, the second network node needs to know the precoding weights.

The first and the second network node may be able to communicate with each other, e.g. by means of an X2 protocol or the like, whereby the first network node may transmit the precoding weights of the beamforming used by the wireless device to the second network node.

The method 300 could be triggered for wireless devices that enter SHO with a serving first network node (e.g. a macro network node) and a second network node (e.g. a LPN). The activation of the feature may be triggered when the wireless device moves into the imbalance region, and inactivated when the wireless device moves out the imbalance region. One example is that the feature may be activated when the wireless device triggers the 1A event (normal or early triggering in case the extended soft handover is applied). The feature may be deactivated when 1D event for LPN is triggered, i.e. the wireless device performs the serving cell change from the first to the second network node (e.g. from the macro network node to the LPN).

The first network node may further instruct the wireless device to enter decoupled mode, wherein the first network node serves the wireless device in downlink and the second network node serves the wireless device in uplink.

Instructing the wireless device to enter (or leave) decoupled mode may be performed by means of an Information Element, IE, of Radio Resource Control, RRC, signalling or Node B Application Part, NBAP, signalling.

Embodiments herein also relate to a wireless device for communicating with a first network node and a second network node by means of a respective cell thereof. The wireless device has the same technical features, objects and advantages as the method performed by the wireless device described above. The wireless device will thus only be described in brief in order to avoid unnecessary repetition.

The wireless device is in soft handover with at least two cells in its active set where downlink is best from one cell and uplink is best towards another cell, wherein the cell providing the best downlink belongs to the first network node and the cell providing the best uplink belongs to the second network node.

Figure 4:
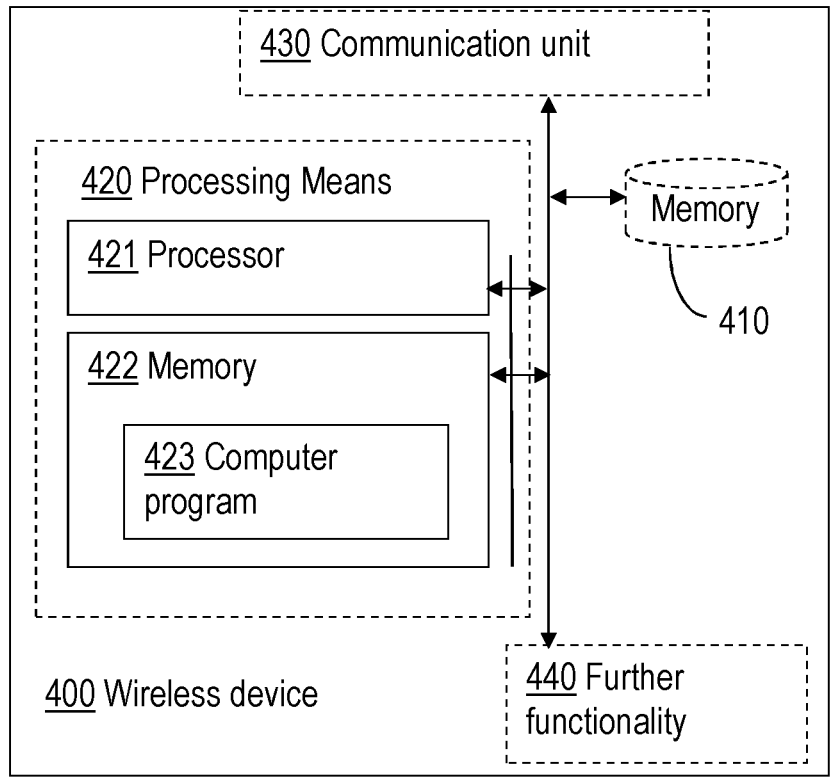
FIG. 4 is a block diagram of a wireless device for communicating with a first network node and a second network node by means of a respective cell thereof, according to an exemplifying embodiment.
Figure 5:
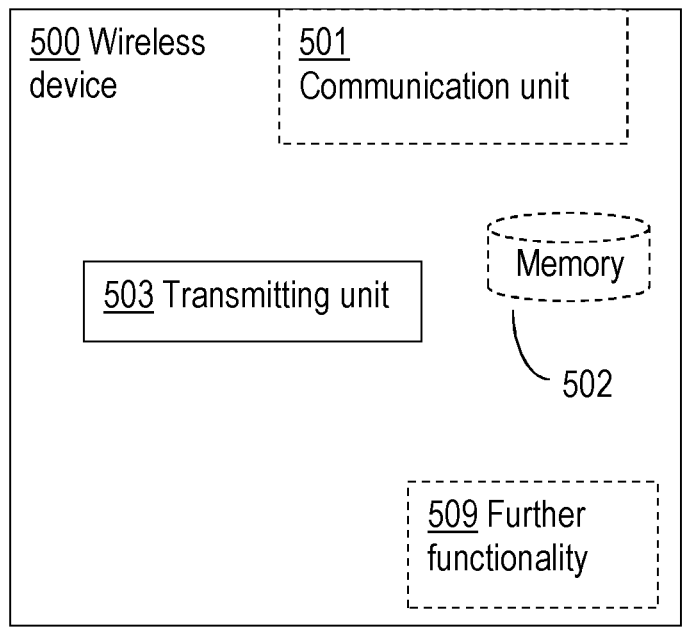
FIG. 5 is a block diagram of a wireless device for communicating with a first network node and a second network node by means of a respective cell thereof, according to another exemplifying embodiment.

FIGS. 4 and 5 illustrates the wireless device 400, 500 being configured for transmitting at least one channel out of a first set of channels using a first beamforming towards the first network node to enhance the reception in the first network node, and transmitting the at least one channel out of the first set of channels or at least one channel out of a second set of channels using a second beamforming towards the second network node to enhance the reception in the second network node.

The wireless device 400, 500 may be implemented or realised in different ways. An exemplifying implementation is illustrated in FIG. 4. FIG. 4 illustrates the wireless device 400 comprising a processor 421 and memory 422, the memory comprising instructions, e.g. by means of a computer program 423, which when executed by the processor 421 causes the wireless device 400 to transmit at least one channel out of a first set of channels using a first beamforming towards the first network node to enhance the reception in the first network node; and to transmit the at least one channel out of the first set of channels or at least one channel out of a second set of channels using a second beamforming towards the second network node to enhance the reception in the second network node.

FIG. 4 also illustrates the wireless device 400 comprising a memory 410. It shall be pointed out that FIG. 4 is merely an exemplifying illustration and the memory 410 may be optional, be a part of the memory 422 or be a further memory of the wireless device 400. The memory may for example comprise information relating to the wireless device 400, to statistics of operation of the wireless device 400, just to give a couple of illustrating examples. FIG. 4 further illustrates the wireless device 400 comprising processing means 420, which comprises the memory 422 and the processor 421. Still further, FIG. 4 illustrates the wireless device 400 comprising a communication unit 430. The communication unit 430 may comprise an interface through which the wireless device 400 communicates with other nodes or entities of the communication network as well as wireless device of the communication network. FIG. 4 also illustrates the wireless device 400 comprising further functionality 440. The further functionality 440 may comprise hardware of software necessary for the wireless device 400 to perform different tasks that are not disclosed herein.

An alternative exemplifying implementation of the wireless device 400, 500 is illustrated in FIG. 5. FIG. 5 illustrates the wireless device 500 comprising a transmitting unit 503 for transmitting at least one channel out of a first set of channels using a first beamforming towards the first network node to enhance the reception in the first network node; and for transmitting the at least one channel out of the first set of channels or at least one channel out of a second set of channels using a second beamforming towards the second network node to enhance the reception in the second network node.

In FIG. 5, the wireless device 500 is also illustrated comprising a communication unit 501. Through this unit, the wireless device 500 is adapted to communicate with other nodes and/or entities in the wireless communication network. The communication unit 501 may comprise more than one receiving arrangement. For example, the communication unit 501 may be connected to both a wire and an antenna, by means of which the wireless device 500 is enabled to communicate with other nodes and/or entities in the wireless communication network. Similarly, the communication unit 501 may comprise more than one transmitting arrangement, which in turn may be connected to both a wire and an antenna, by means of which the wireless device 500 is enabled to communicate with other nodes and/or entities in the wireless communication network. The wireless device 500 further comprises a memory 502 for storing data. Further, the wireless device 500 may comprise a control or processing unit (not shown) which in turn is connected to the unit 503. It shall be pointed out that this is merely an illustrative example and the wireless device 500 may comprise more, less or other units or modules which execute the functions of the wireless device 500 in the same manner as the units illustrated in FIG. 5.

It should be noted that FIG. 5 merely illustrates various functional units in the wireless device 500 in a logical sense. The functions in practice may be implemented using any suitable software and hardware means/circuits etc. Thus, the embodiments are generally not limited to the shown structures of the wireless device 500 and the functional units. Hence, the previously described exemplary embodiments may be realised in many ways. For example, one embodiment includes a computer-readable medium having instructions stored thereon that are executable by the control or processing unit for executing the method steps in the wireless device 500. The instructions executable by the computing system and stored on the computer-readable medium perform the method steps of the wireless device 500 as set forth in the claims.

The wireless device may have the same advantages as the method performed by the wireless device. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

According to an embodiment, when the at least one channel out of the first set of channels is transmitted using the second beamforming, the wireless device further is configured for repeatedly transmitting the channel to the first network node using the first beamforming in a time slot and transmitting the channel to the second network node using the second beamforming in a subsequent time slot.

According to yet an embodiment, wherein the first beamforming comprises two precoding weights, w1 and w2, wherein the wireless device 400, 500 further is configured for receiving, from the first network node, a Transmitted Precoding Indicator, TPI, feedback instructing the wireless device how to update w1 and w2 if necessary.

According to still an embodiment, wherein the second beamforming comprises at least two precoding weights, w3 and w4, wherein the wireless device 400, 500 further is configured for receiving, from the second network node, a Transmission Power Command, TPC, indicating a transmission power for an uplink data transmission when using the at least two precoding weights w3 and w4.

According to another embodiment, the wireless device 400, 500 further is configured for determining updated weights w3 and w4 based on the TPC and transmitting the at least one channel out of the second set of channels to the second network node using a beamforming comprising the at least two updated precoding weights w3 and w4 towards the second network node.

According to yet an embodiment, wherein the second beamforming comprises at least two precoding weights, w3 and w4, wherein the wireless device 400, 500 further is configured for receiving, from the second network node, a TPI feedback instructing the wireless device to update the at least two precoding weights w3 and w4 if necessary.

According to still an embodiment, wherein the wireless device 400, 500 also transmits at least one channel out of a third set of channels towards the first network node using another beamforming than the beamforming used for the transmission of the at least one channel out of the first and the second set of channels, wherein the precoding weights for the beamforming for the transmission of the at least one channel out of the third set of channels are orthogonal to the precoding weights of the first beamforming.

According to another embodiment, the wireless device 400, 500 further is configured for transmitting information to the second network node, the information pertaining to the precoding weights used for the first beamforming used for transmitting the at least one channel out of the first set of channels using the first beamforming towards the first network node.

According to yet another embodiment, the wireless device 400, 500 further is configured for receiving information from the second network node, the information pertaining to feedback information regarding the precoding weights used for the transmission of the at least one channel out of the second set of channels to the second network node.

Embodiments herein also relate to a first network node for communicating with a wireless device in a communication network. The first network node has the same technical features, objects and advantages as the method performed by the first network node described above. The first network node will thus only be described in brief in order to avoid unnecessary repetition.

Figure 6:
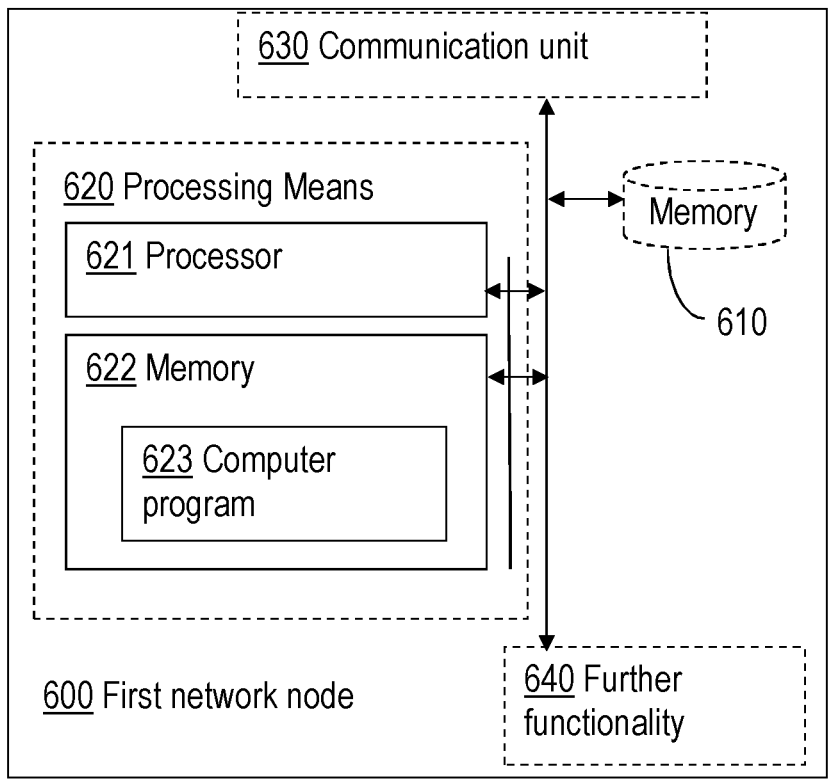
FIG. 6 is a block diagram of a first network node for communicating with a wireless device in a communication network, according to an exemplifying embodiment.
Figure 7:
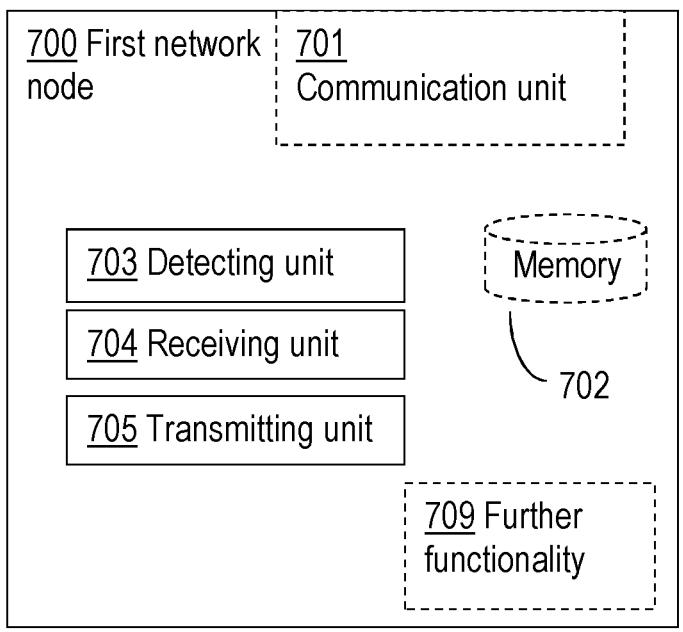
FIG. 7 is a block diagram of a first network node for communicating with a wireless device in a communication network, according to another exemplifying embodiment.

FIGS. 6 and 7 illustrates the first network node 600, 700 being configured for detecting that the wireless device is being in soft handover with at least two cells in its active set, where downlink is best from one cell and uplink is best towards another cell, wherein the cell providing the best downlink belongs to the first network node and the cell providing the best uplink belongs to a second network node; and receiving, from a Radio Network Controller, information that the wireless device supports transmissions of at least one channel of out of set(s) of channels using different beamforming for transmission of at least one channel of the set(s) of channels towards the first network node and towards the a second network node respectively. The first network node 600, 700 is further configured for transmitting information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

The first network node 600, 700 may be implemented or realised in different ways. An exemplifying implementation is illustrated in FIG. 6. FIG. 6 illustrates the first network node 600 comprising a processor 621 and memory 622, the memory comprising instructions, e.g. by means of a computer program 623, which when executed by the processor 621 causes the first network node 600 to detect that the wireless device is being in soft handover with at least two cells in its active set, where downlink is best from one cell and uplink is best towards another cell, wherein the cell providing the best downlink belongs to the first network node and the cell providing the best uplink belongs to a second network node. The memory 622 further comprises instructions, which when executed by the processor 621 causes the first network node 600 to receive, from a Radio Network Controller, information that the wireless device supports transmissions of at least one channel of out of set(s) of channels using different beamforming for transmission of at least one channel of the set(s) of channels towards the first network node and towards the a second network node respectively; and to transmit information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

FIG. 6 also illustrates the first network node 600 comprising a memory 610. It shall be pointed out that FIG. 6 is merely an exemplifying illustration and the memory 610 may be optional, be a part of the memory 622 or be a further memory of the first network node 600. The memory may for example comprise information relating to the first network node 600, to statistics of operation of the first network node 600, just to give a couple of illustrating examples. FIG. 6 further illustrates the first network node 600 comprising processing means 620, which comprises the memory 622 and the processor 621. Still further, FIG. 6 illustrates the first network node 600 comprising a communication unit 630. The communication unit 630 may comprise an interface through which the first network node 600 communicates with other nodes or entities of the communication network as well as wireless devices of the communication network. FIG. 6 also illustrates the first network node 600 comprising further functionality 640. The further functionality 640 may comprise hardware of software necessary for the first network node 600 to perform different tasks that are not disclosed herein.

An alternative exemplifying implementation of the first network node 600, 700 is illustrated in FIG. 7. FIG. 7 illustrates the first network node 700 comprising a detecting unit 703 for detecting that the wireless device is being in soft handover with at least two cells in its active set, where downlink is best from one cell and uplink is best towards another cell, wherein the cell providing the best downlink belongs to the first network node and the cell providing the best uplink belongs to a second network node. The first network node 700 also comprises a receiving unit 704 for receiving, from a Radio Network Controller, information that the wireless device supports transmissions of at least one channels of out of set(s) of channels using different beamforming for transmission of at least one channel of the set(s) of channels towards the first network node and towards the a second network node respectively. Still further, the first network node 700 also comprises a transmitting unit 705 for transmitting information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

The first network node may have the same advantages as the method performed by the first network node. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

According to an embodiment, the first network node 600, 700 is configured for receiving a set of channels being transmitted using first beamforming; determining feedback information for the received set of channels with regard to at least two precoding weights; and transmitting a Transmitted Precoding Indicator, TPI, feedback to the wireless device instructing the wireless device to either keep the at least two precoding weights and or to change to at least two new precoding weights.

According to yet an embodiment, the first network node 600, 700 is further configured for transmitting, to the second network node, information relating to precoding weights used by the wireless device for transmitting a pilot signal to the first network node.

According to still an embodiment, wherein determining that the wireless device supports transmissions of at least one channel out of set(s) of channels using different beamforming for transmission of the set(s) of channels towards the first network node and towards the a second network node respectively, comprises receiving, from a Radio Network Controller, RNC, NBAP signalling comprising a UE capability bit indicating the capability of the wireless device.

Embodiments herein also relate to a second network node for communicating with a wireless device in a wireless communication network, wherein the wireless device is being served by a first network node. The second network node has the same technical features, objects and advantages as the method performed by the second network node described above. The second network node will thus only be described in brief in order to avoid unnecessary repetition.

Figure 8:
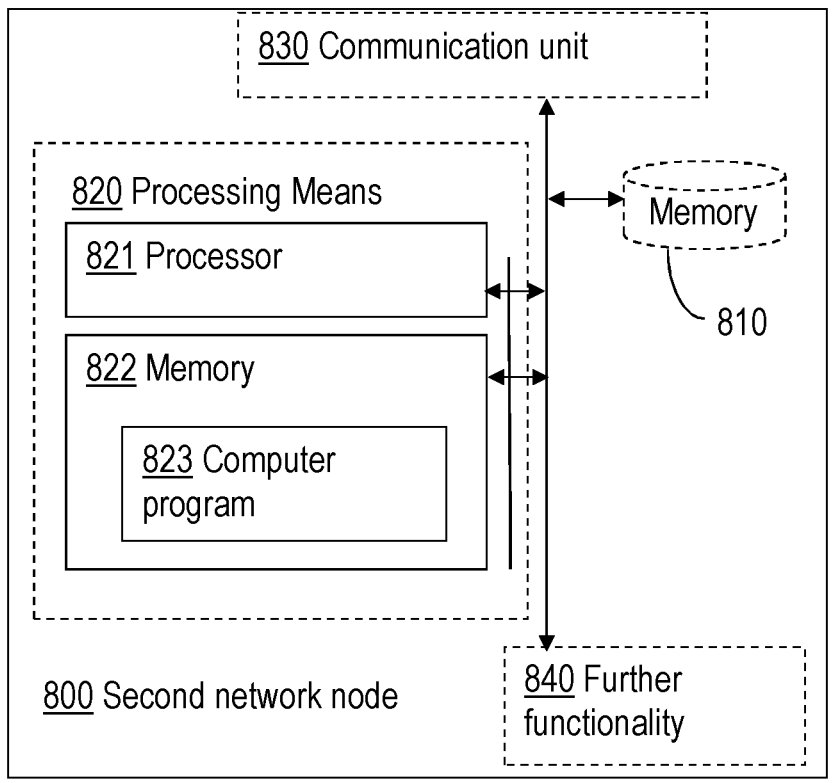
FIG. 8 is a block diagram of a second network node for communicating with a wireless device in a communication network, according to an exemplifying embodiment.
Figure 9:
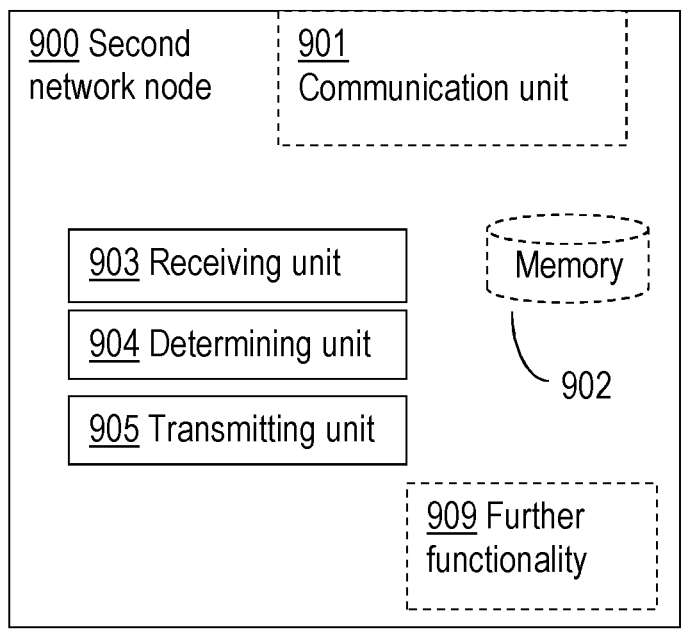
FIG. 9 is a block diagram of a second network node for communicating with a wireless device in a communication network, according to another exemplifying embodiment.

FIGS. 8 and 9 illustrates the second network node 800, 900 being configured for receiving, from the wireless device, at least one channel out of a set of channels transmitted using a beamforming which is different from a beamforming used by the wireless device for transmitting the same or another channel out of another set of channels to the first network node; determining feedback information for the received channel; and transmitting the feedback information to the wireless device.

The second network node 800, 900 may be implemented or realised in different ways. An exemplifying implementation is illustrated in FIG. 8. FIG. 8 illustrates the second network node 800 comprising a processor 821 and memory 822, the memory comprising instructions, e.g. by means of a computer program 823, which when executed by the processor 821 causes the second network node 800 to receive, from the wireless device, at least one channel out of a set of channels transmitted using a beamforming which is different from a beamforming used by the wireless device for transmitting the same or another channel out of another set of channels to the first network node. The memory 822 further comprises instructions, which when executed by the processor 821 causes the second network node 800 to determine feedback information for the received channel(s), and to transmit the feedback information to the wireless device.

FIG. 8 also illustrates the first network node 800 comprising a memory 810. It shall be pointed out that FIG. 8 is merely an exemplifying illustration and the memory 810 may be optional, be a part of the memory 822 or be a further memory of the second network node 800. The memory may for example comprise information relating to the second network node 800, to statistics of operation of the second network node 800, just to give a couple of illustrating examples. FIG. 8 further illustrates the second network node 800 comprising processing means 820, which comprises the memory 822 and the processor 821. Still further, FIG. 8 illustrates the second network node 800 comprising a communication unit 830. The communication unit 830 may comprise an interface through which the second network node 800 communicates with other nodes or entities of the communication network as well as wireless devices of the communication network. FIG. 8 also illustrates the second network node 800 comprising further functionality 840. The further functionality 840 may comprise hardware of software necessary for the second network node 800 to perform different tasks that are not disclosed herein.

An alternative exemplifying implementation of the second network node 800, 900 is illustrated in FIG. 9. FIG. 9 illustrates the second network node 900 comprising a receiving unit 903 for receiving, from the wireless device, at least one channel out of a set of channels transmitted using a beamforming which is different from a beamforming used by the wireless device for transmitting the same or another channel out of another set of channels to the first network node. The second network node 900 also comprises a determining unit 904 for determining feedback information for the received channel(s), and a transmitting unit 905 for transmitting the feedback information to the wireless device.

The second network node may have the same advantages as the method performed by the second network node. One possible advantage is that both the uplink and the downlink throughput may be optimised or maximised when there is an UL/DL imbalance. The robustness of the communication between the involved parties may be improved. Still a possible advantage is that e.g. CQI and HARQ ACK/NACK may be received with improved signal quality in an UP/DL imbalance situation, which in turn may lead to improved DL throughput.

According to an embodiment, the second network node 800, 900 is further configured for determining the feedback by determining a Transmission Power Command, TPC, indicating a transmission power for an uplink data transmission based on the received at least one channel.

According to yet an embodiment, the second network node 800, 900 is further configured for determining the feedback by determining a Transmitted Precoding Indicator, TPI, feedback based on at least two precoding weights of the beamforming used by the wireless device to transmit the at least one channel out of the set of channels, the TPI feedback instructing the wireless device to either keep the at least two precoding weights or to change to at least two new precoding weights.

According to still an embodiment, the second network node 800, 900 is further configured for receiving, from the first network node, information pertaining to the at least two precoding weights of the beamforming used by the wireless device to transmit the at least one channel out of the set of channels.

Figure 10:
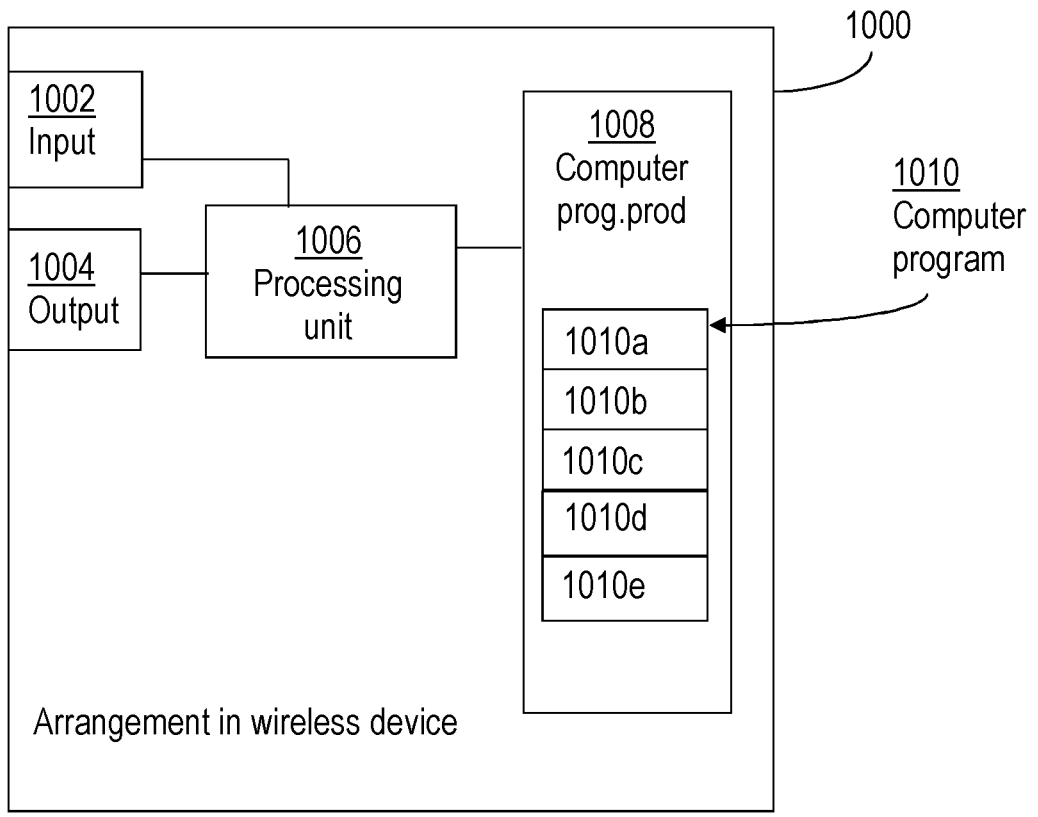
FIG. 10 is a block diagram of an arrangement in a wireless device for communicating with a first network node and a second network node by means of a respective cell thereof, according to an exemplifying embodiment.

FIG. 10 schematically shows an embodiment of an arrangement 1000 in a wireless device 500. Comprised in the arrangement 1000 in the wireless device 500 are here a processing unit 1006, e.g. with a Digital Signal Processor, DSP. The processing unit 1006 may be a single unit or a plurality of units to perform different actions of procedures described herein. The arrangement 1000 of the wireless device may also comprise an input unit 1002 for receiving signals from other entities, and an output unit 1004 for providing signal(s) to other entities. The input unit and the output unit may be arranged as an integrated entity or as illustrated in the example of FIG. 5, as one or more interfaces, or communication units, 501.

Furthermore, the arrangement 1000 of the wireless device comprises at least one computer program product 1008 in the form of a non-volatile memory, e.g. an Electrically Erasable Programmable Read-Only Memory, EEPROM, a flash memory and a hard drive. The computer program product 1008 comprises a computer program 1010, which comprises code means, which when executed in the processing unit 1006 in the arrangement 1000 of the wireless device causes the wireless device to perform the actions e.g. of the procedure described earlier in conjunction with FIGS. 1b-1h.

The computer program 1010 may be configured as a computer program code structured in computer program modules 1010a-1010e. Hence, in an exemplifying embodiment, the code means in the computer program of the arrangement 1000 of the wireless device comprises an transmitting unit, or module, for transmitting at least one channel out of a first set of channels using a first beamforming towards the first network node to enhance the reception in the first network node, and transmitting the at least one channel out of the first set of channels or at least one channel out of a second set of channels using a second beamforming towards the second network node to enhance the reception in the second network node.

The computer program modules could essentially perform the actions of the flow illustrated in FIGS. 1b-1h, to emulate the wireless device 500. In other words, when the different computer program modules are executed in the processing unit 1006, they may correspond to the unit 503 of FIG. 5.

Figure 11:
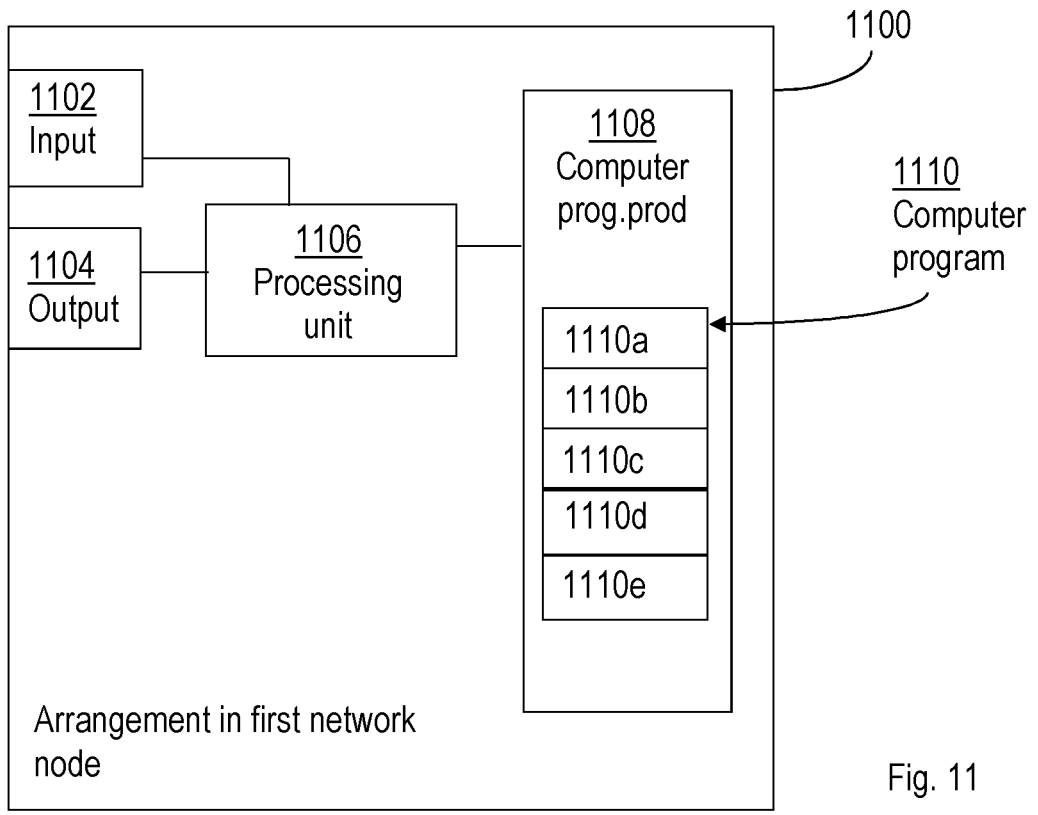
FIG. 11 is a block diagram of an arrangement in a first network node for communicating with a wireless device in a communication network, according to an exemplifying embodiment.

FIG. 11 schematically shows an embodiment of an arrangement 1100 in a first network node 700. Comprised in the arrangement 1100 in the first network node 700 are here a processing unit 1106, e.g. with a DSP. The processing unit 1106 may be a single unit or a plurality of units to perform different actions of procedures described herein. The arrangement 1100 of the first network node may also comprise an input unit 1102 for receiving signals from other entities, and an output unit 1104 for providing signal(s) to other entities. The input unit and the output unit may be arranged as an integrated entity or as illustrated in the example of FIG. 7, as one or more interfaces, or communication units, 701.

Furthermore, the arrangement 1100 of the first network node comprises at least one computer program product 1108 in the form of a non-volatile memory, e.g. an EEPROM, a flash memory and a hard drive. The computer program product 1108 comprises a computer program 1110, which comprises code means, which when executed in the processing unit 1106 in the arrangement 1100 of the first network node causes the first network node to perform the actions e.g. of the procedure described earlier in conjunction with FIGS. 2a-2c.

The computer program 1110 may be configured as a computer program code structured in computer program modules 1110a-1110e. Hence, in an exemplifying embodiment, the code means in the computer program of the arrangement 1100 of the first network node comprises an detecting unit, or module, for detecting that the wireless device is being in soft handover with at least two cells in its active set, where downlink is best from one cell and uplink is best towards another cell, wherein the cell providing the best downlink belongs to the first network node and the cell providing the best uplink belongs to a second network node. The computer program of the arrangement 1100 of the first network node further comprises a receiving unit, or module, for receiving, from a Radio Network Controller, information that the wireless device supports transmissions of at least one channels of out of set(s) of channels using different beamforming for transmission of at least one channel of the set(s) of channels towards the first network node and towards the a second network node. Still further, the computer program of the arrangement 1100 of the first network node comprises a receiving unit, or module, for transmitting information to the wireless device instructing the wireless device to use different beamforming for transmissions of at least one channel of the at least a first set of channels towards the first network node and for transmissions of the at least one channel of the at least the first set of channels or of at least one channel of at least a second set of channels towards the second network node respectively.

The computer program modules could essentially perform the actions of the flow illustrated in FIGS. 2a-2c, to emulate the first network node 700. In other words, when the different computer program modules are executed in the processing unit 1106, they may correspond to the units 703-705 of FIG. 7.

Figure 12:
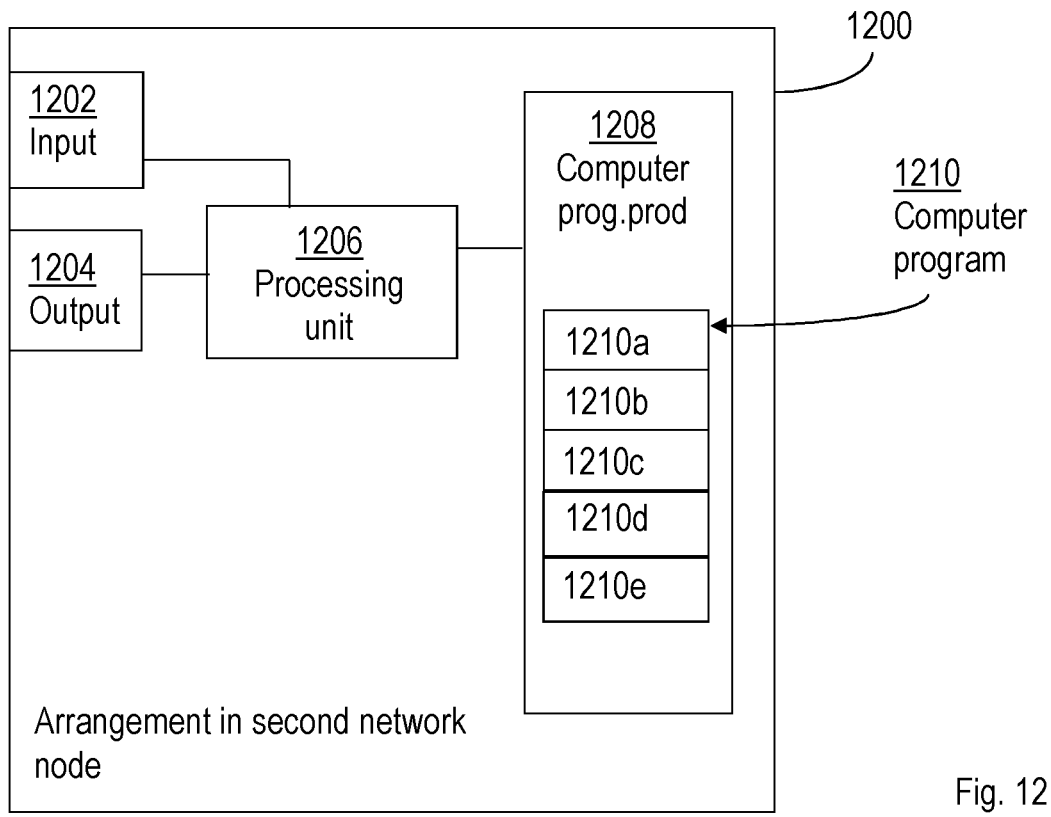
FIG. 12 is a block diagram of an arrangement in a second network node for communicating with a wireless device in a communication network, according to an exemplifying embodiment.

FIG. 12 schematically shows an embodiment of an arrangement 1200 in a second network node 900. Comprised in the arrangement 1200 in the second network node 900 are here a processing unit 1206, e.g. with a DSP. The processing unit 1206 may be a single unit or a plurality of units to perform different actions of procedures described herein. The arrangement 1200 of the second network node may also comprise an input unit 1202 for receiving signals from other entities, and an output unit 1204 for providing signal(s) to other entities. The input unit and the output unit may be arranged as an integrated entity or as illustrated in the example of FIG. 9, as one or more interfaces, or communication units, 901.

Furthermore, the arrangement 1200 of the first network node comprises at least one computer program product 1208 in the form of a non-volatile memory, e.g. an EEPROM, a flash memory and a hard drive. The computer program product 1208 comprises a computer program 1210, which comprises code means, which when executed in the processing unit 1206 in the arrangement 1200 of the second network node causes the second network node to perform the actions e.g. of the procedure described earlier in conjunction with FIGS. 3a-3b.

The computer program 1210 may be configured as a computer program code structured in computer program modules 1210a-1210e. Hence, in an exemplifying embodiment, the code means in the computer program of the arrangement 1200 of the second network node comprises a receiving unit, or module, for receiving, from the wireless device, at least one channel out of a set of channels transmitted using a beamforming which is different from a beamforming used by the wireless device for transmitting the same or another channel out of another set of channels to the first network node. The computer program of the arrangement 1200 of the first network node further comprises a determining unit, or module, for determining feedback information for the received channel(s); and a transmitting unit, or module, for transmitting the feedback information to the wireless device.

The computer program modules could essentially perform the actions of the flow illustrated in FIGS. 3a-3b, to emulate the second network node 900. In other words, when the different computer program modules are executed in the processing unit 1206, they may correspond to the units 903-905 of FIG. 9.

Although the code means in the respective embodiments disclosed above in conjunction with FIGS. 5, 7 and 9 are implemented as computer program modules which when executed in the respective processing unit causes the wireless device and the first and second network nodes respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the wireless device and the first and second network nodes respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Figure 13:
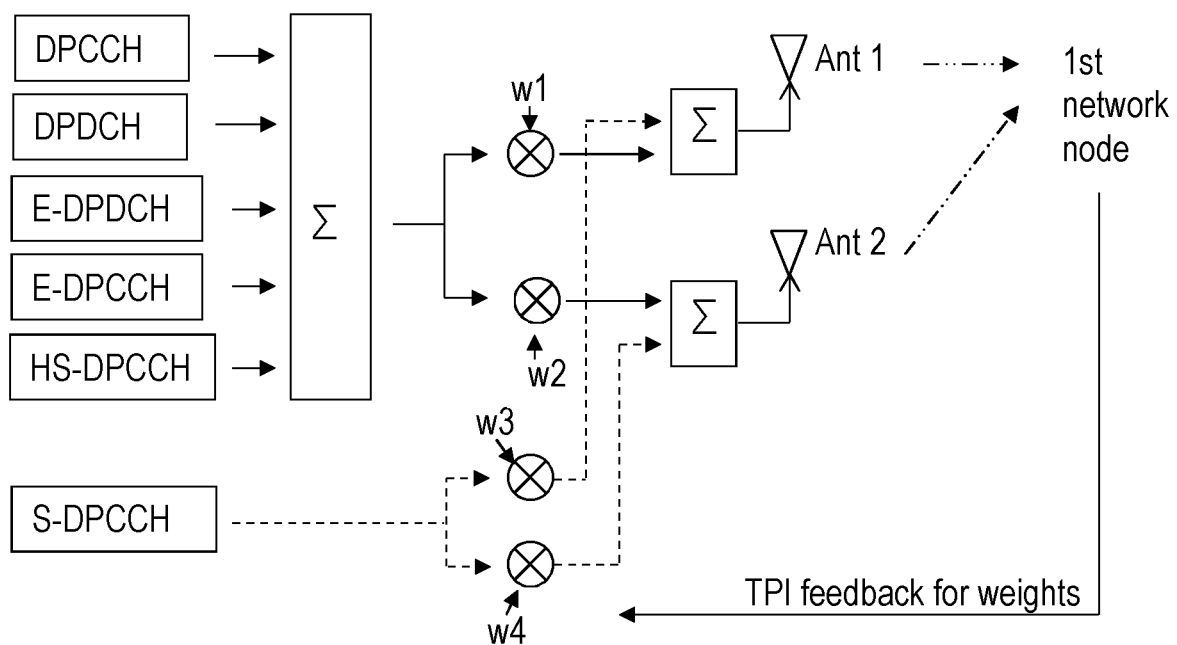
FIG. 13 illustrates an example of uplink closed loop transmit diversity, UL CLTD.

FIG. 13 illustrates an example of uplink closed loop transmit diversity, UL CLTD. If the wireless device supports CLTD and is in the imbalance region, beamforming to the first network node may be achieved by using ordinary CLTD. Applying CLTD (assuming two transmit antennas at the wireless device) has the potential to improve the SIR at the serving macro by roughly 3 dB.

In some cases such as for multi-flow where HS-DSCH is transmitted over two links, UL beamforming towards the weaker link (in this case the UL serving) in order to enhance the DL related control signalling may be used. This may have a positive impact on the DL performance from the weaker link, which is important for multi-flow.

Figure 14:
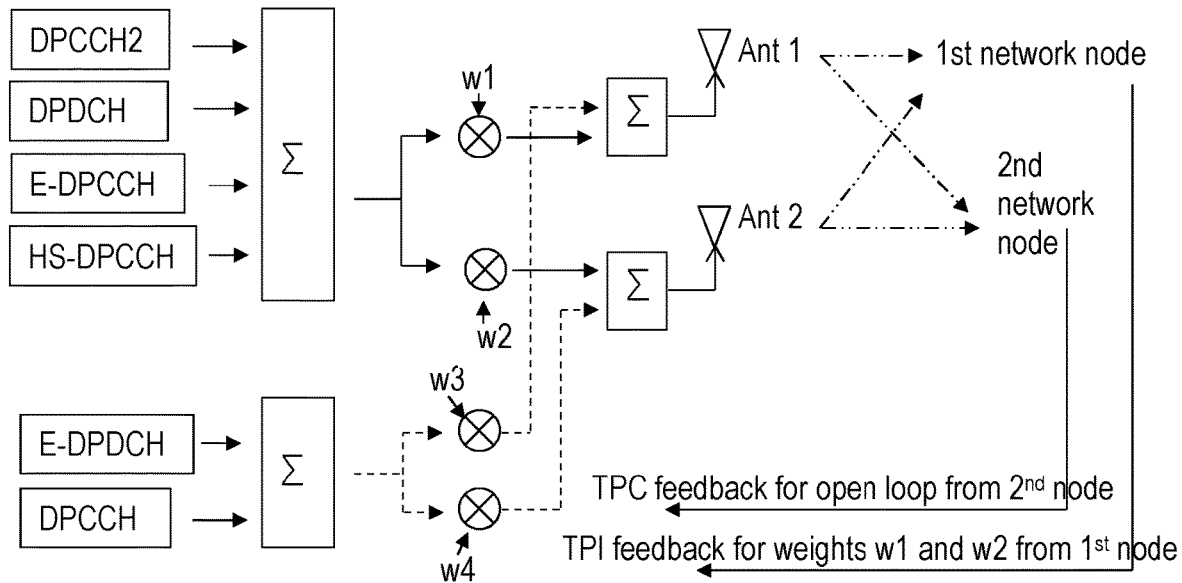
FIG. 14 illustrates an example of CLTD towards a first and a second network node and open loop towards the second network node.

FIG. 14 illustrates an example of CLTD towards a first and a second network node and open loop towards the second network node.

Each network node should be able to estimate the effective channel of the radio channel, or link, in order to perform detection and demodulation. By effective channel estimate means an estimate of the channel experienced by the physical channel of interest (e.g. E-DPDCH or HS-DPCCH). The term effective hence includes both the wireless radio channel and potential precoding. To do efficient sounding, an estimate of the full rank channel is needed.

One solution is to associate e.g. one pilot channel for each groups of physical channels that use different/independent precoding vectors. For example, one pilot is precoded with the same weights as HS-DPCCH and another pilot is precoded with the same weights as E-DPDCH.

For CLTD operation the S-DPCCH is introduced in an example. This physical channel contains pilot symbols and uses other beamforming weights than DPCCH. Currently, the weights for S-DPCCH may be determined by the weights for DPCCH via an orthogonality constraint. However, this constraint could be removed and thereby facilitating two pilots with independent precoding weights. Hence, as an example, HS-DPCCH and DPCCH are pre-coded in order to maximise reception quality at the first network node, e.g. a serving macro cell, while E-DPDCH and S-DPCCH are precoded to maximise reception at the second network node, e.g. a LPN. Note, though, that if the pilot channel uses the same precoder as the channel of interest, then there is no need for the receiver to know the exact weights used (precoder is part of the effective channel that is estimated from the pre-coded pilot). However, if the receiver should make a good decision about what weights to use and feedback those the wireless device, then the receiver essentially needs to know the full rank channel (not only a rank-1 channel vector) to make good choices. For this to work, the receiver needs to be informed about what weights the other pilot is currently employing.

Different flavours of this approach exist. One approach is to not precode the pilots at all, in which case the receiver needs to know the precoder weights used by the physical channel of interest. Hence, from the pilots, the full rank non-pre-coded channel is estimated. The receiver then applies the appropriate precoder to the estimated channel to arrive at the effective channel estimate.

Similar approach may be used when DPCCH2 is configured (for example heterogeneous communication networks, in which the ideas presented in this disclosure are particularly interesting). A scenario where both S-DPCCH and DPCCH2 are configured is possible.

In FIG. 14, CLTD is applied to a set of channels including those important for robust reception in the serving macro cell, i.e. DPCCH2, DPDCH, E-DPCCH and HS-DPCCH. The other channels i.e. E-DPDCH and DPCCH are precoded based on an open loop from the LPN.

In this example, the first network node determines precoding weights $w_1$ and $w_2$ based on channel estimates from the DPCCH2. The weights are fed back to the wireless device using TPI feedback on the Fractional Transmitted Precoding Indicator Channel; F-TPICH. Note that in this case the first network node cannot estimate the full channel without knowing the precoding weights $w_3$ and $w_4$. Hence, the selection of weights $w_1$ and $w_2$ is not optimal.

The open loop pre-coding is implemented based on the TPC feedback from the second network node. Since the wireless device is in the imbalance region, the second network node is effectively controlling the DPCCH power implying that the weight selection will impact the TPC feedback making the open loop possible (this would not be the case if open loop based on TPC from the first network node was used since the first network node TPC would typically be "up").

Figure 15:
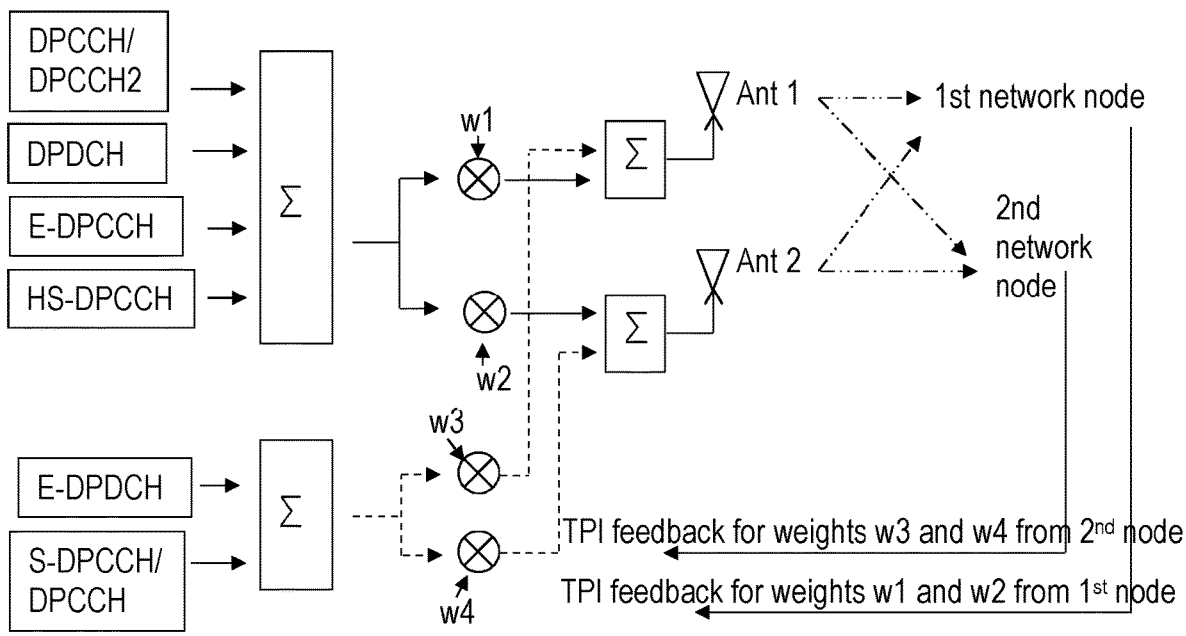
FIG. 15 illustrates an example of CLTD for control channels towards a first network node and beamforming UL data towards a second network node.

FIG. 15 illustrates an example of CLTD for control channels towards a first network node and beamforming UL data towards a second network node.

In the example illustrated in FIG. 15, two pilot channels are used. There are two possibilities available. Either the DPCCH is precoded using w1 and w2, and S-DPCCH is pre-coded using w3 and w4. The other possibility is to use DPCCH2, in which case the DPCCH2 is pre-coded using w1 and w2 and the DPCCH is pre-coded using w3 and w4. The reason for using w1 and w2 for DPCCH2 is that it is power controlled from the first network node and hence is reliably received there. This may not be the case for the DPCCH if the imbalance is high.

The legacy feedback channel can be used for TPI feedback for the CLTD (w1-w2) weights and is transmitted from the macro. In addition to this, corresponding feedback from the LPN is needed for the weights (w3-w4), which may be transmitted using e.g. a new feedback channel. Note that in this implementation, the precoding weights w3 and w4 are not necessarily orthogonal to w1 and w2 as is the case in ordinary CLTD.

Figure 16:
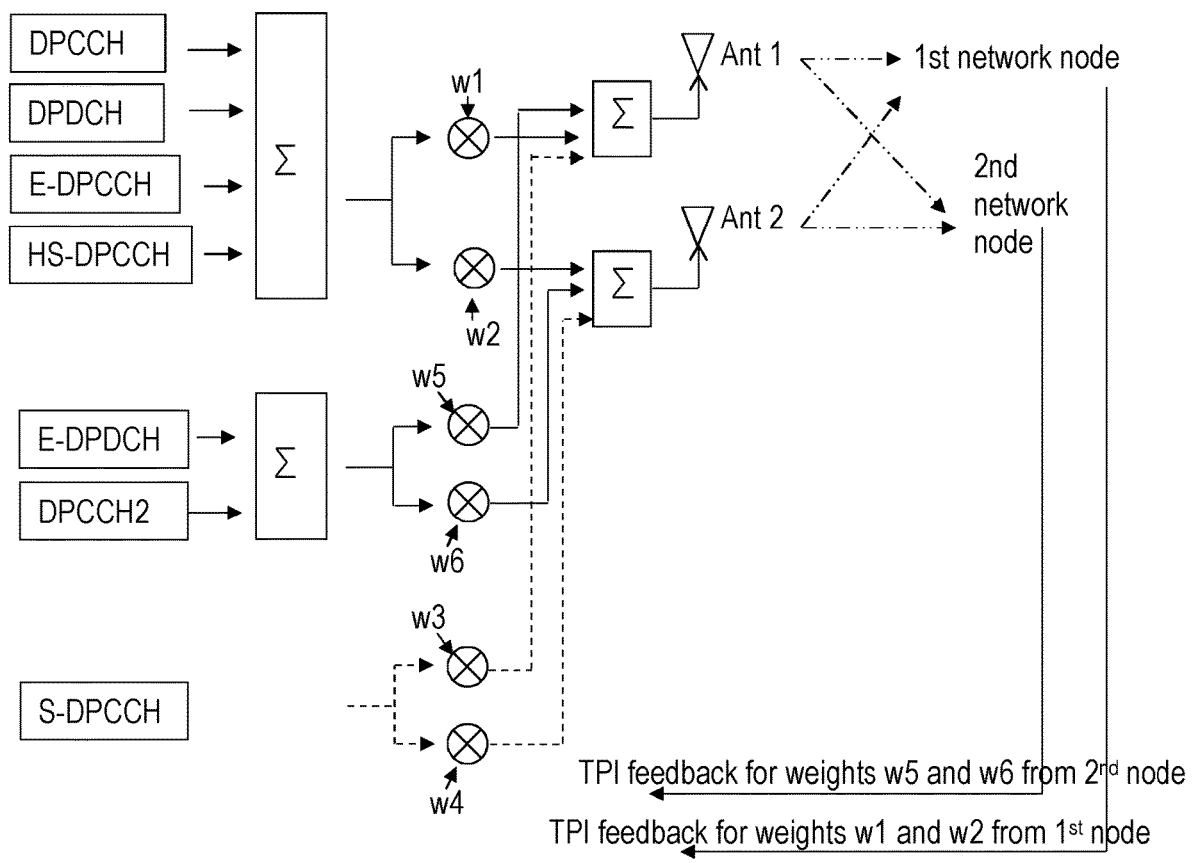
FIG. 16 illustrates an example of CLTD for control channels towards a first network node with additional pilot and beamforming UL data towards a second network node.

FIG. 16 illustrates an example of CLTD for control channels towards a first network node with additional pilot and beamforming UL data towards a second network node.

In order to select the pre-coding weights more optimal, full rank channel estimation is needed. One way to achieve this is to use more pilots with known (or no) precoding weights. In the example depicted in FIG. 16, the weights w3 and w4 are chosen to be orthogonal to w1 and w2. This enables the first network node to estimate the channel with full rank and may therefore select the precoding weights w1 and w2 in an optimal way. Hence the beamforming of the channels towards the first network node are enhanced.

The methods described herein could be triggered for wireless devices that enter soft handover with a serving first network node (e.g. a macro network node) and a second network node (e.g. a LPN). The activation of the feature may be triggered when the wireless device moves into the imbalance region, and inactivated when wireless device moves out the imbalance region. One example is that the feature can be activated when UE triggers the 1A event (normal or early triggering in case the extended soft handover is applied). The feature can be deactivated when 1D event for LPN is triggered, i.e. wireless device performs the serving cell change from first network node to second network node.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a second network node for communicating with a wireless device in a wireless communication network, wherein the wireless device is being served by a first network node, the method comprising:
   receiving, from the wireless device, at least one channel out of a set of channels transmitted using a beamforming which is different from another beamforming used by the wireless device for transmitting same or another channel out of another set of channels to the first network node,
   determining feedback information for the received at least one channel, wherein determining the feedback information comprises determining a Transmitted Precoding Indicator (TPI) feedback based on at least two precoding weights of the beamforming used by the wireless device to transmit the at least one channel out of the set of channels, and
   transmitting the feedback information to the wireless device.

2. The method according to claim 1, wherein determining the feedback information further comprises determining a Transmission Power Command (TPC) indicating a transmission power for an uplink data transmission based on the received at least one channel.

3. The method according to claim 1, wherein the TPI feedback instructs the wireless device to either keep the at least two precoding weights or to change the at least two precoding weights to at least two new precoding weights.

4. A wireless device for communicating with a first network node and a second network node by means of a respective cell thereof, the wireless device being in soft handover with at least two cells, wherein the wireless device being in soft handover with the at least two cells is in an active set, wherein downlink is best from one cell and uplink is best towards another cell, and wherein the cell providing the best downlink belongs to the first network node and the cell providing the best uplink belongs to the second network node, the wireless device being configured for:
   transmitting at least one channel out of a first set of channels using a first beamforming towards the first network node to enhance reception in the first network node, and
   transmitting the at least one channel out of the first set of channels or at least one channel out of a second set of channels using a second beamforming towards the second network node to enhance reception in the second network node, and wherein when the at least one channel out of the first set of channels is transmitted using the second beamforming, the wireless device is further configured for repeatedly transmitting the at least one channel to the first network node using the first beamforming in a time slot and transmitting the at least one channel to the second network node using the second beamforming in a subsequent time slot.

5. The wireless device according to claim 4, wherein the first beamforming comprises two precoding weights w1 and w2, and wherein the wireless device is further configured for receiving, from the first network node, a Transmitted Precoding Indicator (TPI) feedback instructing the wireless device how to update the two precoding weights w1 and w2, if necessary.

6. The wireless device according to claim 4, wherein the second beamforming comprises at least two precoding weights w3 and w4, and wherein the wireless device is further configured for receiving, from the second network node, a Transmission Power Command (TPC) indicating a transmission power for an uplink data transmission when using the at least two precoding weights w3 and w4.

7. The wireless device according to claim 6, further being configured for determining at least two updated precoding weights w3 and w4 based on the TPC, and transmitting the at least one channel, out of the second set of channels to the second network node, using a beamforming comprising the at least two updated precoding weights w3 and w4 towards the second network node.

8. A second network node for communicating with a wireless device in a wireless communication network, wherein the wireless device is being served by a first network node, the second network node being configured for:
   receiving, from the wireless device, at least one channel out of a set of channels transmitted using a beamforming which is different from another beamforming used by the wireless device for transmitting same or another channel out of another set of channels to the first network node,
   determining feedback information for the received at least one channel, wherein the second network node is further configured to determine the feedback information by determining a Transmitted Precoding Indicator (TPI) feedback based on at least two precoding weights of the beamforming used by the wireless device to transmit the at least one channel out of the set of channels, and
   transmitting the feedback information to the wireless device.

9. The second network node according to claim 8, further being configured for determining the feedback information by determining a Transmission Power Command (TPC) indicating a transmission power for an uplink data transmission based on the received at least one channel.

10. The second network node according to claim 8, wherein the TPI feedback instructs the wireless device to either keep the at least two precoding weights or to change the at least two precoding weights to at least two new precoding weights.

* * * * *